(12) United States Patent
Yang et al.

(10) Patent No.: US 6,331,974 B1
(45) Date of Patent: Dec. 18, 2001

(54) CHAOTIC DIGITAL CODE-DIVISION MULTIPLE ACCESS (CDMA) COMMUNICATION SYSTEMS

(75) Inventors: Tao Yang; Leon O. Chua, both of Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/103,044

(22) Filed: Jun. 23, 1998

Related U.S. Application Data

(60) Provisional application No. 60/050,460, filed on Jun. 23, 1997.

(51) Int. Cl.[7] .................................................. H04B 7/216

(52) U.S. Cl. .......................... 370/342; 370/441; 375/140

(58) Field of Search .............................. 370/203, 204–209, 370/320, 335, 342, 441; 375/130, 131, 140, 295, 316

(56) References Cited

PUBLICATIONS

Vijay K. Garg, et al., *Applications of CDMA in Wireless/Personal Communications*, (1997), pp. 1–48.

Klein S. Gilhousen, et al., On the Capacity of a Cellular CDMA System, IEEE Transactions on Vehicular Technology, vol. 40, No. 2, (May 1991), pp. 303–312.

K. Sean Halle, et al., Spread Spectrum Communication Through Modulation of Chaos, International Journal of Bifurcation and Chaos, vol. 3, No. 2, (1993), pp. 469–477.

Michael G. Jansen, et al., Capacity, Throughput, and Delay Analysis of a Cellular DS CDMA System With Imperfect Power Control and Imperfect Sectorization, IEEE Transaction on Vehicular Technology, vol. 44, No. 1, (Feb. 1995), pp. 67–75.

Donald E. Knuth, *The Art of Computer Programming*, second edition, vol. 2/Seminumerical Algorithms, (1981), pp. 38–73.

William C. Y. Lee, *Mobile Cellular Telecommunications*, Second edition, (1995), pp. 103–156.

William C. Y. Lee, Overview of Cellular CDMA, IEEE Transactions on Vehicular Technology, vol. 40, No. 2, (May 1991), pp. 291–302.

Leon O. Chua, Chua's Circuit An Overview Ten Years Later, Journal of Circuits, Systems and Computers, vol. 4, No. 2, (1994) pp. 117–159.

Marvin K. Simon, et al., *Spread Spectrum Communications Handbook*, (1994), pp. 262–365.

Jorge A. Ulloa, et al., An Expert System Approach for Cellular CDMA, IEEE Transactions on Vehicular Technology, vol. 44, No. 1, (Feb. 1995), pp. 146–154.

(List continued on next page.)

*Primary Examiner*—David R. Vincent
(74) *Attorney, Agent, or Firm*—Allston L. Jones

(57) ABSTRACT

In the present invention, the structure, principle and framework of chaotic digital code-division multiple access ((CD)$^2$MA) communication systems are presented. Unlike the existing CDMA systems, (CD)$^2$MA systems use continuous pseudo-random time series to spread the spectrum of message signal and the spread signal is then directly sent through channel to the receiver. In this sense, the carrier used in (CD)$^2$MA is a continuous pseudo-random signal instead of a single tone as used in CDMA. The statistical properties of the noise-like carriers are given. In a (CD)$^2$MA system, every mobile station has the same structure and parameters, only different initial conditions are assigned to different mobile stations. Instead of synchronizing two binary pseudo-random sequences as in CDMA systems, an impulsive control scheme is used to synchronize two chaotic systems in (CD)$^2$MA. Simulation results show that the channel capacity of (CD)$^2$MA is at least twice as large than that of CDMA.

47 Claims, 18 Drawing Sheets

PUBLICATIONS

Andrew J. Viterbi, *CDMA Principles of Spread Spectrum Communication*, (1995), pp. 84–93.

Geng Wu, et al., On Channel Model Parameters for Microcellular CDMA Systems, IEEE Transactions on Vehicular Technology, vol. 44, No. 3, (Aug. 1995), pp. 706–711.

Raymond L. Pickholtz, et al., Spread Spectrum for Mobile Communications, IEEE Transactions on Vehicular Technology, vol. 40, No. 2, (May 1991), pp. 313–322.

Yoshifumi Nishio, et al., Chaotic Phenomena in an LCR Oscillator With A Hysteresis Inductor, Circuits and Systems, 1991 IEEE International Symposium, (1991), 5 pages.

M. I. Sobhy, et al., Chaotic Behaviour of Distributed Nonlinear Circuits, Circuits and Systems, 1992 IEEE International Symposium, (1992), 5 pages.

Naohiko Inaba, et al., Chaotic Circuit Family with a Diode due to the Change of the Oscillation Frequency, Circuits and Systems, 1991 IEEE International Symposium, (1991), 5 pages.

Toshimichi Saito, The Hysteresis Chaos Generator Family, Circuits and Systems, 1988 IEEE International Symposium, (1988), 5 pages.

Toshimichi Saito, An Approach Toward Higher Dimensional Hysteresis Chaos Generators, IEEE Transactions on Circuits and Systems, vol. 37, No 3. (Mar. 1990), pp. 399–409.

Tao Yang, et al., Cryptography Based on Chaotic Systems, IEEE Transactions on Circuits and Systems–I: Fundamental Theory and Applications, vol. 44, No. 5, (May 1997), pp. 469–472.

Tao Yang, et al., Impulsive Control and Synchronization of Nonlinear Dynamical Systems and Appplication to Secure Communication, International Journal of Bifurcation and Chaos, vol. 7, No. 3, (1997), pp. 1–20.

José M. Cruz, et al., A CMOS IC Nonlinear Resistor for Chua's Circuit, IEEE Transactions on Circuits and Systems–I: Fundamental Theory and Applications, vol. 39, No. 12, (Dec. 1992), pp. 985–995.

L. O. Chua, A Zoo of Strange Attractors from the Canonical Chua's Circuits, Circuits and Systems, 1992 IEEE Midwest Symposium, (1992), 12 pages.

Leon O. Chua, et al., Canonical Realization of Chua's Circuit Family, IEEE Transaction on Circuits and Systems, vol. 37, No. 7, (Jul. 1990), pp. 885–901.

Leon O. Chua, et al., Sights and Sounds of Chaos, IEEE Circuits and Devices Magazine, vol. 4, No. 1, (Jan. 1988), pp. 3–13.

Tao Yang, et al., Impulsive Control and Synchronization of Chaotic Systems and Secure Communication, Memorandum No. UCB/ERL M97/12, Electronics Research Laboratory, College of Engineering, UC Berkeley, (Jan. 29, 1997), pp. 1–28.

CHAOTIC DIGITAL CODE-DIVISION MULTIPLE ACCESS (CDMA) COMMUNICATION SYSTEMS

This application claims the benefit of provisional application No. 60/050,460, filed on Jun. 23, 1997.

GOVERNMENT RIGHTS

This invention was made with U.S. Government support under Grant No. N00014-96-1-0753 awarded by the Office of Naval Research. The U.S. Government has certain rights in this invention.

BACKGROUND OF THE INVENTION

In the 1980s, many analog cellular communication networks were implemented over the world. These networks are already reaching their capacity limits in several service areas. This wireless communication technology has evolved from simple first-generation analog systems for business applications to second-generation digital systems with rich features and services for residential and business environments. There are several reasons for the transition from wireless analog to wireless digital technology: increasing traffic, which requires greater cell capacity; speech privacy; new services; and greater radio link robustness.

During the late 1980s and early 1990s, the rapid growth in mobile communications put a high demand on system capacity and the availability of the technology for low-cost implementation of cellular and personal communication services (PCS). CDMA has a larger system capacity than the existing analog systems. The increased system capacity is due to improved coding, gain/modulation density, voice activity, three-sector sectorization, and reuse of the same spectrum in every cell. CDMA is a cost-effective technology that requires fewer, less-expensive cells and no costly frequency reuse pattern. The power transmitted by the CDMA mobile stations averages about 6–7 mW, which is less than one tenth of the average power typically required by FM and TDMA telephones. Transmitting less power means longer battery life. CDMA can improve the quality-of-service by providing both robust operation in fading environments and transparent (soft) hand-off. CDMA takes advantage of multipath fading to enhance communications and voice quality. In narrow-band systems, fading causes a substantial degradation of signal quality.

Since some new services, such as wide-band data and video, are much more spectrum-intensive than voice service, even the channel capacity improvement provided by CDMA will be depleted in the near future. This motivates some advanced wireless communication schemes, which can provide a greater capacity.

There are several problem areas with CDMA systems that are becoming more serious as the demand for greater capacity increases. Some of these problems are: spreading carriers; orthogonal functions; and synchronous considerations.

Spreading Carriers

In CDMA systems pseudo-random signals are used to: (1) spread the bandwidth of the modulated signal to the larger transmission bandwidth; and (2) distinguish among the different user signals which are using the same transmission bandwidth in the multiple-access scheme.

Ideally, these pseudo-random signals should be samples of a sequence of independent random variables, uniformly distributed on an available alphabet or range. In this case, the CDMA system is equivalent to a one-time pad used in cryptographic systems requiring the highest level of security. Since the key signal in a one-time pad should be as long as the message signal, it is not feasible to use it in CDMA.

A way must be found to store/generate good pseudo-random signals in both the transmitter and the receiver, despite the finite storage capacity/generating capacity of physical processing systems.

Orthogonal Functions

Orthogonal functions are used to improve the bandwidth efficiency of a spread spectrum system. In CDMA, each mobile station uses one of a set of orthogonal functions representing the set of symbols used for transmission. Usually, the Walsh and Hadamard sequences are used to generate these kind of orthogonal functions for CDMA.

In CDMA, there exist two different methods of modulating the orthogonal functions into the information stream of the CDMA signal. The orthogonal set of functions can be used as the spreading code or can be used to form modulation symbols that are orthogonal.

Synchronization Considerations

In a CDMA system, the heart of the receiver is its synchronization circuitry, and the heartbeats are the clock-pulses which control almost every step in forming the desired output. There exist three levels of synchronization in a CDMA system: (1) correlation interval synchronization; (2) spread-spectrum generator synchronization; and (3) carrier synchronization.

To correlate the Walsh codes at the receiver requires that the receiver be synchronized with the transmitter. In the forward direction, the base station can transmit a pilot signal to enable the receiver to recover synchronization. Just as the designers of the IS-665 wide-band CDMA system believed, with a wider bandwidth the base station can also recover the pilot signal sent by mobile stations.

What is needed is a system that will overcome each of these increasingly troublesome conditions. The $(CD)^2MA$ system of the present invention provides that solution.

SUMMARY OF THE INVENTION

With respect to the spreading carriers issue, it would be very inexpensive and energy efficient to generate such a sequence by using some chaotic circuits, e.g., Chua's circuits. In fact, some methods to generate good pseudo-random signals for cryptographic purposes by using Chua's circuits have already been developed.

Next, with respect to orthogonal functions, it is very hard to find a theory to guarantee that the spectrum-spreading carriers are orthogonal with $(CD)^2MA$ systems. However, from simulations of the present invention that are discussed below it will be seen that there are many methods to generate signals, which have very small cross correlations, by using chaotic signals. Therefore good spectrum-spreading carriers can be chosen from many promising candidates. In addition, in $(CD)^2MA$ systems the "orthogonal function" itself serves as the carrier.

Finally, with regard to the synchronization considerations, in $(CD)^2MA$ systems the symmetric system between base station and mobile station is also used. To do so with a $(CD)^2MA$ system, two chaotic systems need to be synchronized. If the continuous synchronization scheme is used, a channel to transmit the chaotic signal is needed. Even though a message signal can be embedded into a chaotic carrier, a chaotic CDMA system can not be achieved. A promising method to improve this is the framework of impulsive synchronization. Discussed below is the fact that a $(CD)^2MA$ system does not need the correlation interval synchronization and carrier synchronization. This makes the receiver in $(CD)^2MA$ simple and low-power.

Additionally, the (CD)²MA system can increase the capacity of a radio channel. For mobile subscribers, this increased capacity translates to better service at a lower price. On the other hand, (CD)²MA systems are also a promising technology for low-cost implementation of cellular and PCS.

BRIEF DESCRIPTION OF THE FIGURES

FIGS. 5a through 5g illustrate the simulation results of the (CD)²MA system of the present invention with 60 users/cell and $E_b/N_o$=4 dB, wherein: FIG. 5a shows the mixed signal in the channel which is a mixture of 60 spreading carriers; FIGS. 5b, c and d show the spreading carriers of users A, B and C, respectively; and FIGS. 5e, f and g show the message signals (dotted waveforms) and the recovered signals (continuous overall waveforms) for users A, B and C, respectively.

FIGS. 6a through 6c illustrate the simulation results of the (CD)²MA system of the present invention with 110 users/cell and $E_b/N_o$=4 dB, wherein: FIG. 6a shows the message signal (dotted waveform) and the recovered signal (continuous overall waveform) for user A; FIG. 6b shows the message signal (dotted waveform) and the recovered signal (continuous overall waveform) for user B; and FIG. 6c shows the message signal (dotted waveform) and the recovered signal (continuous overall waveform) for user C.

FIGS. 7a through 7c illustrate the simulation results of the (CD)²MA system with 90 users/cell and $E_b/N_o$=4 dB, wherein FIG. 7a shows the message signal (dotted waveform) and the recovered signal (continuous overall waveform) for user A; FIG. 7b shows the message signal (dotted waveform) and the recovered signal (continuous overall waveform) for user B; and FIG. 7c shows the message signal (dotted waveform) and the recovered signal (continuous overall waveform) for user C.

DESCRIPTION OF THE PREFERRED EMBODIMENT

Figure 1:
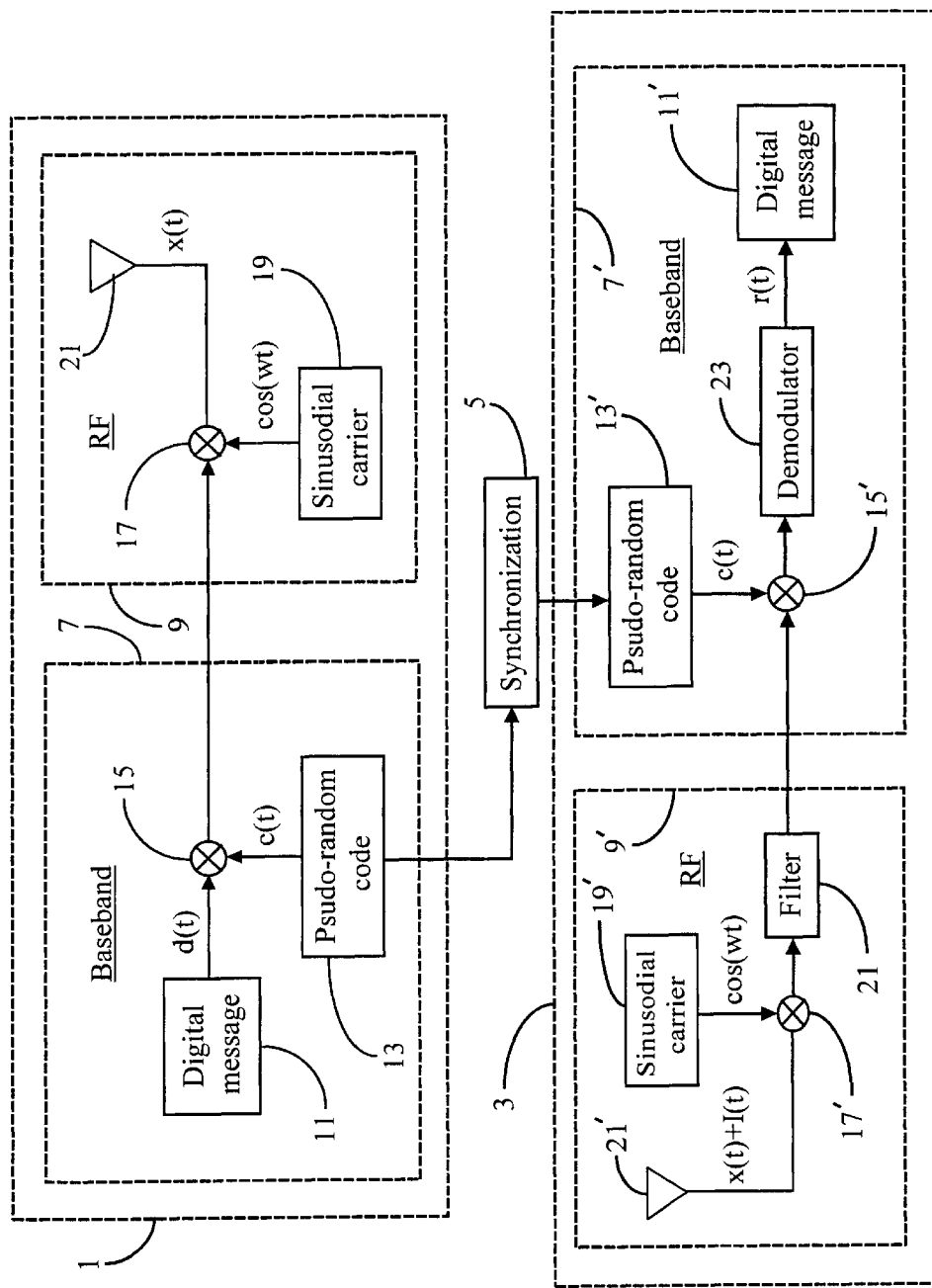
FIG. 1 is a block diagram of the CDMA system of the prior art.

In FIG. 1 the prior art CDMA system is illustrated in a simplified form with a first user unit 1 that is shown here as the transmitting unit, and a second user unit 3 that is shown here as a receiving unit. Each of user units 1 and 3 are shown having two subsystems, a baseband module 7 and 7', respectively, and an RF module 9 and 9', respectively.

In user unit 1, baseband module 7 includes a digital message generator/decoder 11 that produces digital message signal d(t). In addition there is a pseudo-random code generator 13 that generates a spreading signal, c(t). Signals d(t) and c(t) are each applied to a multiplier 15 with the product of those signals being passed on to a second multiplier 17 in RF module 9. In RF module 9, a sinusoidal carrier generator 19 produces the carrier signal cos(ωt) which is also applied to multiplier 17 to produce the encoded signal, x(t), for transmission from antenna 21.

In user unit 3, there is a substantially similar structure to that of user unit 1, however since user unit 3 is in the receive mode there is some variation in the internal structure of unit 3. Those elements which are the same as in user unit 1 have the same reference numbers with a prime, ', added to them for distinction. The components which are necessary for the receive function of user unit 3 will become clear as the general operation is discussed below.

Thus, the signal, x(t), transmitted from user unit 1 as it propagates through the atmosphere acquires an interference element, I(t), generally referred to as channel noise, from any number of sources. Thus, the signal received at antenna 21' in RF module 9' is expressed as x(t) +I(t), and is applied to multiplier 17'. As in user unit 1, sinusoidal carrier generator 19' in user unit 3 generates a carrier signal cos(ωt) of substantially the same frequency as that of the carrier signal in user unit 1. That carrier signal is then applied to multiplier 17' to produce the signal [x(t)+I(t)]·cos(ωt) that is applied to filter 21 to substantially reduce the magnitude of the contribution of I(t). The filtered signal is then transferred to the baseband module of user unit 2 and applied to multiplier 15'. Pseudo-random code generator 13' generates a spreading signal, c(t), that is substantially the same as that produced in user unit 1, with c(t) also being applied to multiplier 15' to be multiplied with the output of filter 21, with the product signal applied to demodulator 23 to generate the recovered signal, r(t), that should be substantially the same as d(t), for application to digital message generator/decoder 11'.

In each of user units 1 and 3, the source and destination of the data to/from digital message generator/decoder 11 and 11' is immaterial. It might be a voice module with the two users using units 1 and 3 as cell phones, or a computer, etc.

A synchronization unit 5 is also shown in FIG. 1 between each of user units 1 and 3. The location of synchronization unit 5 is not critical in that it could be located in a variety of locations, anyone of which is as good as another. For example, synchronization unit 5 could be in the transmitting device (i.e., user unit 1 in FIG. 1); the receiving device (i.e., user unit 3 in FIG. 1); or a base station (not shown) which receives the signal from the transmitting device, performs the synchronization and then retransmits the signal to the receiving device.

Information can be modulated into the spread-spectrum signal by several methods. The most common method is to add the information into the spectrum-spreading code before it is used for modulating the carrier frequency. In FIG. 1, d(t) and c(t) are respectively called "message signal" and "spreading signal". The signal cos(ωt) is called the carrier, and x(t) is the encoded signal being transmitted by the transmitter user unit 1. At the receiver end, (i.e., user unit 3) the received signal includes a component I(t) that is an interference signal which consists of all channel noise, interference and/or jamming, and r(t) is the recovered signal. In a typical IS-95 CDMA system, d(t) is a low frequency digital message signal with a data rate 9.6 Kbps (where kps is $10^3$ bits per second), and c(t) is a high frequency spreading signal with a chip rate 1.2288 Mcps (where Mcps is $10^6$ chips per second). Note that the chip rate is much higher than the data rate. This is the method by which the bandwidth of the message signal is spread.

Figure 2:
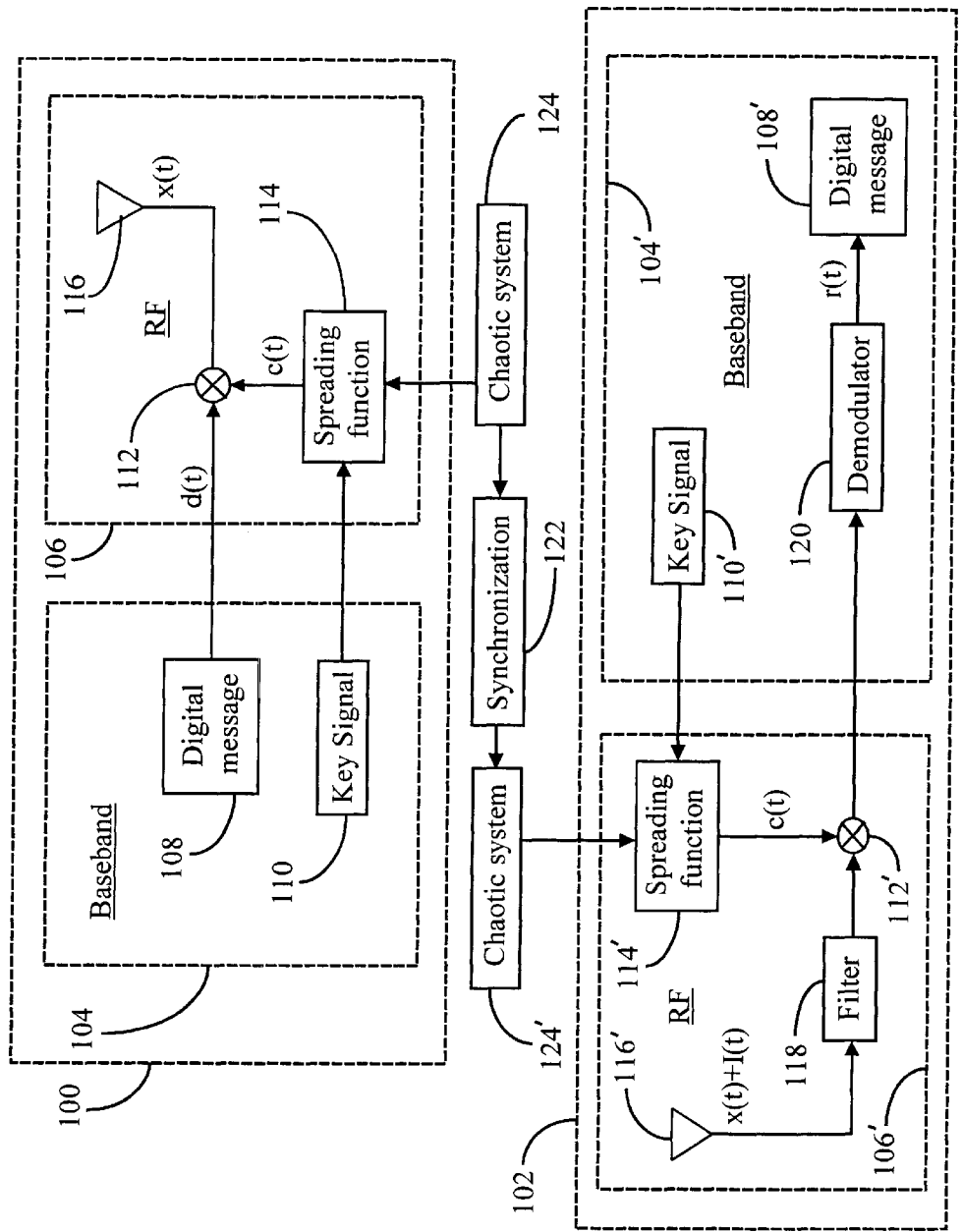
FIG. 2 is a block diagram of the (CD)²MA system of the present invention.

FIG. 2 is a block diagram of the $(CD)^2MA$ system of the present invention in which it can be seen that the message signal, d(t), modulates the carrier directly, with the spectrum-spreading signal functioning as the carrier.

In FIG. 2 the $(CD)^2MA$ system of the present invention is illustrated in a simplified form similar to that of the CDMA prior art unit in FIG. 1. Here also there is a first user unit 100 that is shown as the transmitting unit, and a second user unit 102 that is shown here as a receiving unit with each of user units 100 and 102 having two subsystems, a baseband module 104 and 104', respectively, and an RF module 106 and 106', respectively.

In user unit 100, baseband module 104 includes a digital message generator/decoder 108 that produces digital message signal, d(t), similar to digital message generator/decoder 11 of FIG. 1. Additionally, there is shown an optional key signal module 110. The digital message generator/decoder 108 feeds the signal d(t) to multiplier 112 of RF module 106, and key signal module 110, if used, feeds a signal to spreading function generator 114 also in RF module 106.

In RF module 106, spreading function generator 114 also applies the spreading function, c(t), to multiplier 112 where it serves the dual purpose of the spreading function and also the carrier modulated by the digital message, d(t), to form the encoded signal, x(t), to be transmitted from antenna 116.

In user unit 102, there is a substantially similar structure to that of user unit 100, however since user unit 102 is in the receive mode there is some variation on the internal structure of unit 102. Those elements which are the same as in user unit 100 have the same reference numbers with a prime, ', added to them for distinction. The components which are necessary for the receive function of user unit 102 will become clear as the general operation is discussed below.

As in the CDMA case, the signal, x(t), transmitted from user unit 100 as it propagates through the atmosphere acquires an interference element, I(t), generally referred to as channel noise, from any number of sources. Thus, the signal received at antenna 116' in RF module 106' is expressed as x(t)+I(t), and is applied to filter 118 to substantially reduce the magnitude of the contribution of I(t). The filtered signal is then applied to multiplier 112'. Spreading function generator 114' also applies the spreading function, c(t), to multiplier 112'. The combination of the filtered input signal and spreading function, c(t), is then applied to demodulator 120 in baseband module 104' to generate the recovered signal, r(t), that should be substantially the same as d(t), for application to digital message generator/decoder 108'. Additionally, baseband module 104' optionally includes key signal generator 110' to apply a key code to spreading function generator 114' in RF module 106' with a key code that matches the one used by the transmitting first user unit 100, if the key code has been used.

In each of user units 100 and 102, the source and destination of the data to/from digital message generator/decoder 108 and 108' is immaterial. It might be a voice module with the two users using units 100 and 102 as cell phones, or a computer, etc.

In the present invention, there is also a synchronization unit 122 that functions similarly to that of the synchronization unit 5 of the CDMA system of FIG. 1. Also shown in FIG. 2, interfacing synchronization unit 122 with each of user units 100 and 102 are similar chaotic system 124 and 124', respectively. The location of synchronization unit 122 and chaotic systems 124 and 124' is not critical in that they could be located in a variety of locations, anyone of which is as good as another. For example, synchronization unit 122 and chaotic system 124 could be in the transmitting device (i.e., user unit 100) with chaotic system 124' in the receiving device (i.e., user unit 102); synchronization unit 122 and chaotic system 124' could be in the receiving device (i.e., user unit 102) with chaotic system 124 in the transmitting device (i.e., user unit 100); or a base station (not shown) which receives the signal from the transmitting device, performs the synchronization and then retransmits the signal to the receiving device could contain all three units.

Comparing the $(CD)^2MA$ system in FIG. 2 with the CDMA system in FIG. 1, it can be seen that both schemes use the synchronization of two identical spreading carrier generators. Instead of modulating a single tone (an RF sinusoidal signal) as in the CDMA system, the $(CD)^2MA$ system transmits a pseudo-random RF spreading carrier directly. To enhance the security of the $(CD)^2MA$ system, two key signals can be used to scramble the spreading carrier. The key signal can be assigned to each transmitter and receiver pair by the base station. Since each mobile station can function either as a transmitter or as a receiver, those key signals are set in both the receiver and the transmitter and can be refreshed during transmissions. The key signals are only needed in cases where very high security should be taken into account (e.g., military applications). In commercial applications, the spreading signal alone is secure enough for most data.

In the $(CD)^2MA$ paradigm, every mobile station has the same chaotic circuit (e.g., Chua's circuit) which may be implemented in firmware or descrete components. Whenever a receiver-transmitter pair are connected by the base station, they are assigned the same set of initial conditions for the chaotic circuits, wherein these initial conditions would typically be in a look-up table either in each of the receiver-transmitter pair or in the base station with either the first transmitting unit or the base station selecting them (perhaps at random) and then the parameters of that choice are provided to the first receiving unit. Then, the impulsive synchronization scheme is used to maintain the synchronization between the two chaotic circuits.

Since the chaotic circuit works in a low frequency range, the spreading function needs to spread the chaotic signal into bandwidths in the MHz range in some applications. In principle, there are many nonlinear functions which can be used as spreading functions. For purposes of this discussion, the spreading function is chosen as an n-shift scheme to spread the spectrum of the chaotic signal (see Tao Yang, Chai Wah Wu and Leon O. Chua, "CRYPTOGRAPHY BASED ON CHAOTIC SYSTEMS", *IEEE Transactions on Circuits and systems—I: Fundamental theory and applications*, vol. 44 (5), pp. 469–472, May 1997). The chaotic systems in both transmitter and receiver are identical and synchronization between them are achieved by a new chaotic synchronization scheme called impulsive synchronization. The demodulator consists of some low-pass filtering and thresholding blocks.

A. Statistical Properties of Chaotic Spreading Carriers

Attention is now directed to the properties of the spreading signal, c(t), which should have a narrow autocorrelation function for achieving a large channel capacity and small cross-relations. One of the ideal candidates for this kind of signal is white noise which has an autocorrelation function of a Dirac Delta function at the origin. Although from a deterministic model a true white noise signal can not be generated, however an approximation thereof can be generated which is referred to here as a pseudo-random signal. Since the cryptographic community has spent half a century trying to find a good binary pseudo-random signal for purposes of high security levels for cryptographic algorithms, some of those methods are used here.

First the chaotic system generates a good seed, low frequency signal in the KHz range, and then a spreading function is used to spread the spectrum into the MHz range. In the following discussion, Chua's oscillator (see L. O. Chua, "Chua's circuit—an overview ten years later", *Journal of Circuit, Systems, and Computers*, vol.4 (2), pp. 117–159, January 1994) is used as chaotic systems 124 and 124'.

Figure 3A:
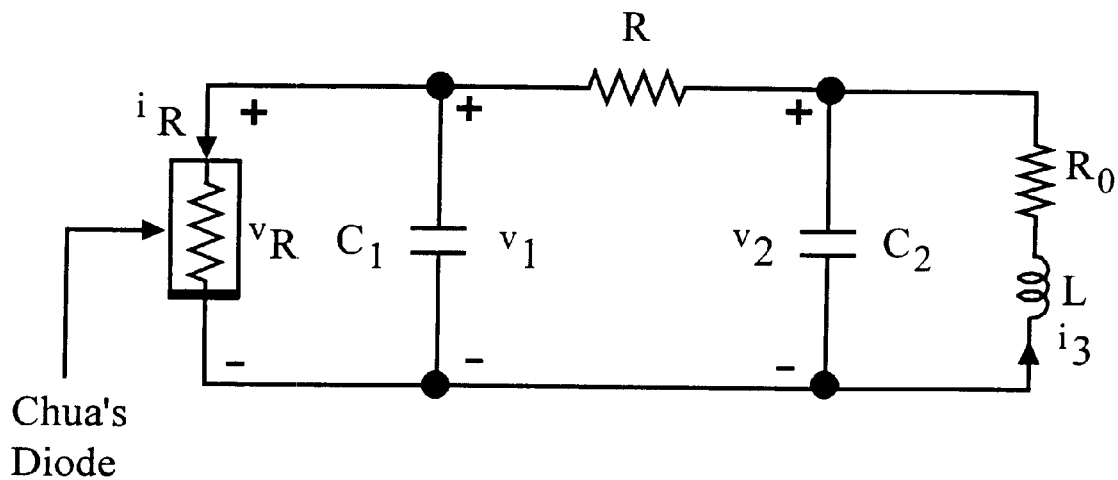
FIG. 3a is a schematic representation of Chua's oscillator of the prior art.

Chua's oscillator is shown in FIG. 3a with a parallel combination of a first capacitor, $C_1$ and a Chua's diode on the left side of the figure, and an L-C tank circuit on the right side of the figure that consists of a second capacitor, $C_2$, connected in parallel with a serially connected inductor, L, and linear resistor $R_0$. In addition, a first voltage, $v_1$, is defined across capacitor $C_1$ and second voltage, $v_2$, defined across capacitor $C_2$ with the positive orientation of voltages $v_1$ and $v_2$ both being at the top end of the corresponding capacitor. Finally, there is another linear resistor, R, connected between the positive terminals of each on capacitors $C_1$ and $C_2$. The dynamics of Chua's oscillator is illustrated by Equation 1 as follows:

$$\begin{cases} \frac{dv_1}{dt} = \frac{1}{C_1}[G(v_2 - v_1) - f(v_1)] \\ \frac{dv_2}{dt} = \frac{1}{C_2}[G(v_1 - v_2) + i_3] \\ \frac{di_3}{dt} = -\frac{1}{L}[v_2 + R_0 i_3] \end{cases} \quad (1)$$

Figure 3B:
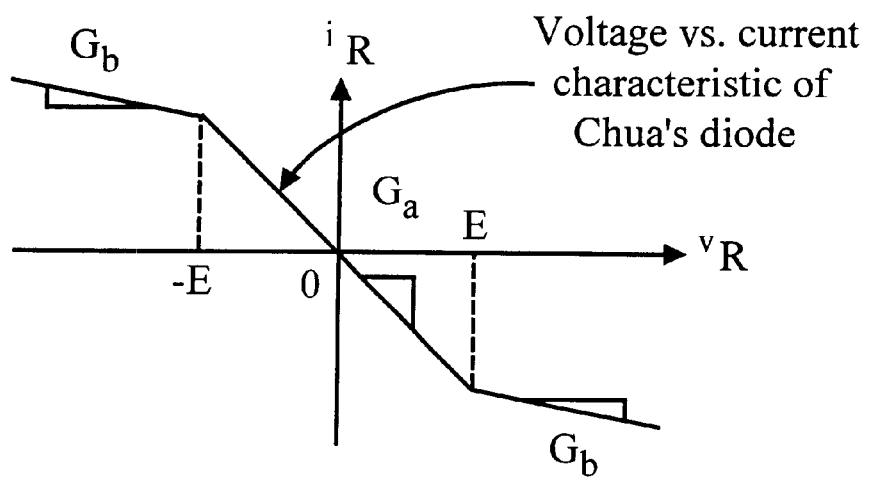
FIG. 3b is voltage versus current graph of the operation of Chua's diode of the prior art.

FIG. 3b illustrates the non-linear performance of Chua's diode of FIG. 3a with positive and negative voltage break points of E and –E. The function f(●) in equation 1 is the nonlinear characteristics of Chua's diode which is given by Equation 2 as follows:

$$f(v_1) = G_b v_1 + \tfrac{1}{2}(G_a - G_b)(|v + E| - |v_1 - E|) \quad (2)$$

To spread the chaotic signal generated by a Chua's circuit a continuous n-shift cipher is used for purposes of discussion here. Such an n-shift cipher is given by Equation 3 as follows:

$$x(t) = \varepsilon(p(t)) = \underbrace{f_1(\ldots f_1(f_1(p(t), p(t)), p(t)), \ldots, p(t))}_{n} \quad (3)$$

where h (see FIGS. 4a and 4b, and Equation 4) is chosen such that p(t) lies within (–h,h) and $f_1(●, ●)$ is a nonlinear function as in Equation 4 as follows:

$$f_1(x, k) = \begin{cases} (x+k) + 2h, & -2h \le (x+k) \le -h \\ (x+k), & -h < (x+k) < h \\ (x+k) - 2h, & h \le (x+k) \le 2h \end{cases} \quad (4)$$

Figure 4A:
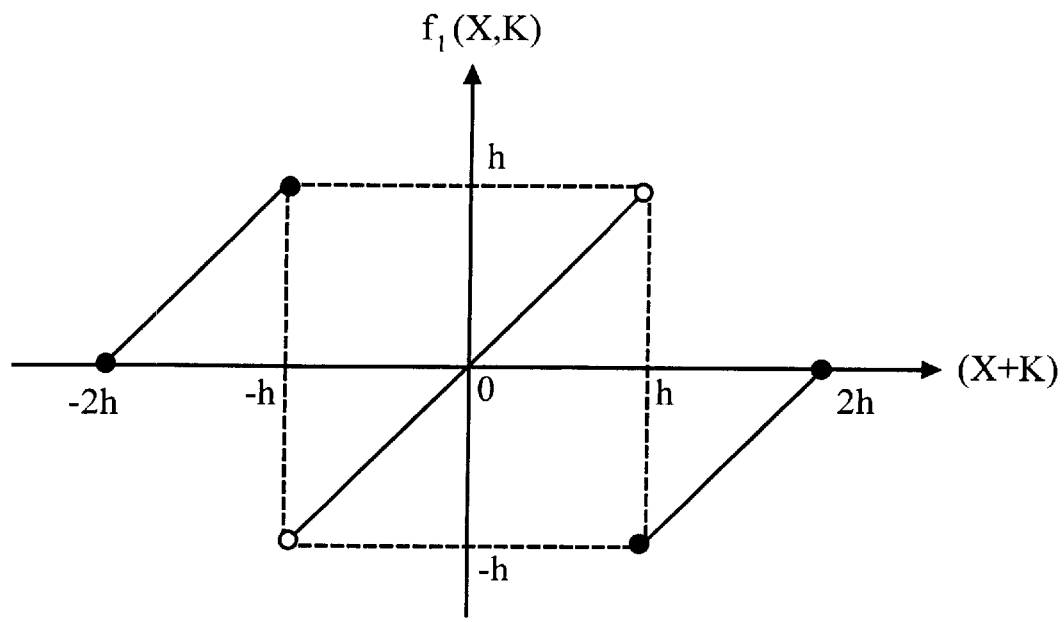
FIG. 4a is a representation of the ideal model of a nonlinear function used in a continuous shift cipher of the prior art.
Figure 4B:
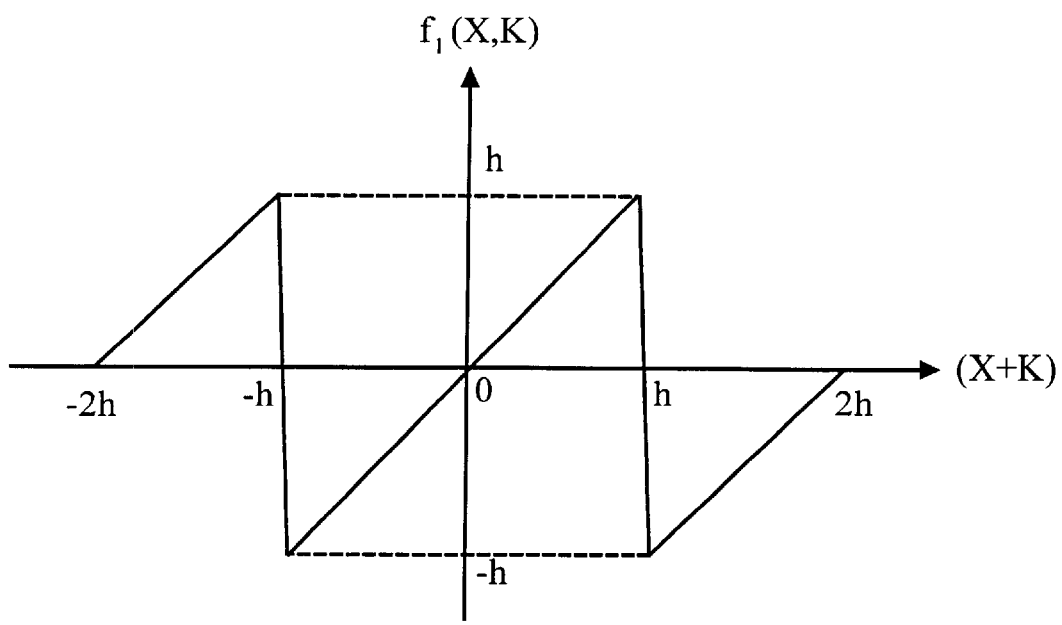
FIG. 4b is a representation of a practical implementation of a nonlinear function used in a continuous shift cipher of the prior art.

The function, $f_1(●, ●)$, is shown in FIG. 4a. Since the "jump-type" break points in FIG. 4a can not be implemented in a practical circuit, a continuous version that approximates these characteristics is needed and is shown in FIG. 4b. In this case, $f_1(●, ●)$ is given by Equation 5 as follows:

$$f_1(x, k) = \begin{cases} \frac{h}{h-\Delta}(x+k) + 2h, & -2h \le (x+k) \le -h-\Delta \\ -\frac{h}{\Delta}(x+k+h), & -h-\Delta \le (x+k) < -h+\Delta \\ \frac{h}{h-\Delta}(x+k), & -h+\Delta \le (x+k) < h-\Delta \\ -\frac{h}{\Delta}(x+k-h), & h-\Delta \le (x+k) < h+\Delta \\ \frac{h}{h-\Delta}(x+k) - 2h, & h+\Delta \le (x+k) \le 2h \end{cases} \quad (5)$$

In the $(CD)^2MA$ system of the present invention, the seed signal, p(t), is chosen as the voltage, $v_1(t)$, of Chua's circuit. Choosing h=1V, it follows that p(t) is a normalized version of $v_1(t)$. Before the output of the n-shift function can be used as the spreading carrier, c(t), the statistical properties of that n-shift function have to be tested. In $(CD)^2MA$ systems of the present invention, the following sample parameter values are used: $C_1$=5.56 nF, $C_2$=50 nF, G=0.7 mS (where ms is $10^{-3}$ Siemens), L=7.14 mH, $G_a$=–0.8 mS, $G_b$=–0.5 mS, E=1v, $R_0$=0Ω and Δ=0.01. Given this set of parameters, Chua's circuit has a double-scroll attractor.

There are many tests that can be used to help establish the random characteristics of a signal (e.g., see D. Z. Knuth, *The Art of Computer Programming* (vol.2), Addison-Wesley, Canada, 1981). For purposes of this discussion, two frequency tests are used: the $X^2$ test and the Kolmogorov-Smirnof (K-S) test are both discussed by Knuth. They are used to verify that the signal is uniformly distributed.

For the $\chi^2$ test, the range of the transmitted signal, x(t), is divided into 51 intervals. The expectation is an equal number of observations in each interval. Thus the $\chi^2$ values computed on each sample will be expected to follow a $\chi_v^2$ distribution with 50 degrees of freedom.

For the K-S test, $K^+$ and $K^-$ are computed for each of the samples of x(t). The values are expected to be $K_n$-distributed, where n is the number of samples in sampled x(t). In simulations using this test the following values were selected: n=$10^5$ with a sampling interval of $10^{-7}$ s.

The following tests which were based on $X^2$-tests are also used.

Serial test: In the sequences of sampled x(t), it is desired that pairs of successive numbers be uniformly distributed in an independent manner. To carry out the serial test, a simple count is performed as to the number of times that the sampled pair (x(2j), x(2j+1)) fall in different regions of the plane [–1, 1]×[–1, 1] (i.e., the first "[–1,1]" defines the range of values of the plane along the x axis (from –1 to +1 on the x axis), and the second "[–1,1]" defines the range of values of the plane along the y axis (from –1 to +1 on the y axis) thus defining a square having a size of 2 absolute units in each of the x and y directions). The interval [–1, 1] is split into d subintervals and each of them is coded by an integer from 1 to d. When x(2j) falls into a subinterval, the code associated with that subinterval, an integer $Y_{2j}$, is used to represent it. This kind of coding system is also used in the other tests. To carry out the serial test, the number of times that $(Y_{2j}, Y_{2j+1})$=(q, r) occurs, for $1 \le q$, $r \le d$ is simply counted. And the $\chi^2$-test is applied to these k=$d^2$ categories with probability $1/d^2$ for each category. If d=8 is chosen, the sequence of blocks should have a length greater than or equal to $5d^2$, or in this example 1280.

Gap test: This test is used to test the length of "gaps" between occurrences of $Y_j$ in a certain range. If α and β are two real numbers with $0 \le \alpha < \beta < d$, the lengths of consecutive subsequences $Y_j, Y_{j+1}, \ldots, Y_{j+r}$, in which $Y_{j+r}$ lies between α and β but the other Y's do not, needs to be considered. For this test, d=9 was chosen.

Poker test: The classical poker test considers n groups of five successive integers, $(Y_{5j}, Y_{5j+1}, Y_{5j+2}, Y_{5j+3}, Y_{5j+4})$ for $0 \leq j < n$, and observes which of the following five categories is matched by each quintuple: 5 different, 4 different, 3 different, 2 different and 1 different.

In general, n groups of k successive numbers can be considered, and the number of k-tuples with r different values counted. A $\chi^2$-test is then made, using the probability as expressed in Equation 6 as follows:

$$p_r = \frac{d(d-1) \ldots (d-r+1)}{d^k} \left\{ \begin{matrix} k \\ r \end{matrix} \right\} \tag{6}$$

of which there are r different values, and $\left\{ \begin{smallmatrix} k \\ r \end{smallmatrix} \right\}$ is a Stirling number (e.g., see K. S. Halle, Chai Wah Wu, M. Itoh, and L. O. Chua, "Spread Spectrum Communication Through Modulation of Chaos", *International Journal of Bifurcation and Chaos in Applied Sciences and Engineering*, vol. 3 (2), pp. 469–77, Apr. 1993). For purposes of illustration d=9 was chosen.

In Table 1 the test results for x(t) with different initial conditions with 10-shift cipher function are given.

TABLE 1

Results of different statistical tests of chaotic spreading carriers when different initial conditions are used.

|  | $v_1(0) = -0.204$ v<br>$v_2(0) = 0.045$ v<br>$i_3(0) = 1.561$ mA | $v_1(0) = 1.568$ v<br>$v_2(0) = -0.741$ v<br>$i_3(0) = 2.301$ mA | $v_1(0) = 0.1$ v<br>$v_2(0) = 2.515$ v<br>$i_3(0) = -1.901$ mA | $v_1 = -2.56$ v<br>$v_2 = -1.349$ v<br>$i_3 = -2.002$ mA |
|---|---|---|---|---|
| $X^2$ Test | 0.021 | 0.013 | 0.054 | 0.07 |
| K-S Test, $K^+$ | 0.011 | 0.044 | 0.034 | 0.009 |
| K-S Test, $K^-$ | 0.034 | 0.025 | 0.029 | 0.012 |
| Serial Test | 0.008 | 0.067 | 0.045 | 0.074 |
| Gap Test | 0.055 | 0.054 | 0.082 | 0.03 |
| Poker Test | 0.063 | 0.019 | 0.018 | 0.06 |

In Table 1, when a test result is between 0.01 and 0.99, it denotes that transmitted signal, x(t), can be viewed as a good pseudo-random sequence. The bold face numbers in Table 1 denote the test results which do not belong to good pseudo-random sequences. Since there are only two test results belonging to the "bad" pseudo-random cases, it can be concluded that the randomness of x(t) is good enough to design spreading carriers. Further, it can be seen that this randomness is an initial condition independent. This initial condition independent property can be used to simplify the hardware of mobile stations because only different initial conditions need to be given to each mobile station for generating its spreading carrier. Since these tests are used in testing the randomness of sequences for cryptographic purposes, it can also be concluded that a good pseudo-random sequence should have a very narrow autocorrelation function.

B. Impulsive Synchronization of Chua's Circuits in (CD)$^2$MA

The idea of applying of impulsive synchronization to (CD)$^2$MA is inspired by the fact that every mobile station of a CDMA system has a clock signal to make the receiver work autonomously once the clock signal is synchronized with that of the transmitter. The difference between impulsive synchronization and continuous synchronization is that, in the former, once synchronization is achieved the receiver can work autonomously for a given time duration, wherein that time is variable and is influenced by many factors including, but not limited to, background noise, mismatch, etc. This is achieved by sending synchronizing impulses to the receiver. Synchronizing impulses should be sent to the receiver at a given frequency because the noise and parameter mismatches between the chaotic systems in the transmitter and the receiver will soon desynchronize both. For this reason, in the (CD)$^2$MA system an overhead channel is needed to transmit synchronizing impulses.

Here, the impulsive synchronization of the two Chua's oscillators is considered. One of the Chua's oscillators is called the driving system and the other is called the driven system. In an impulsive synchronization configuration, the driving system is given by Equation 1. By letting $X^T = (v_1, v_2, i_3)$, the driving system in Equation 1 can be rewritten into the form of Equation 7 as follows:

$$\dot{x} = Ax + \Phi(x) \tag{7}$$

where $$A = \begin{pmatrix} -G/C_1 & G/C_1 & 0 \\ G/C_2 & -G/C_2 & 1/C_2 \\ 0 & -1/L & -R_0/L \end{pmatrix}, \tag{8}$$

$$\Phi(x) = \begin{pmatrix} -f(v_1)/C_1 \\ 0 \\ 0 \end{pmatrix}$$

Then the driven system is given by Equation 9 as follows:

$$\dot{\tilde{x}} = A\tilde{x} + \Phi(\tilde{x}) \tag{9}$$

where $\tilde{x}^T = (\tilde{v}_1, \tilde{v}_2, \tilde{i}_3)$ are the state variables of the driven system.

At discrete instants, $\tau_i$, i=1, 2, . . . , the state variables of the driving system are transmitted to the driven system and then the state variables of the driven system are subject to jumps at these instants. In this sense, the driven system is described by an impulsive differential equation as in Equation 10 as follows:

$$\begin{cases} \dot{\tilde{x}} = A\tilde{x} + \Phi(\tilde{x}), t \neq \tau_i \\ \Delta\tilde{x}|_{t=\tau_i} = -Be, i = 1, 2, \dots \end{cases} \quad (10)$$

where B is a 3×3 matrix, and $e^T=(\epsilon_1, \epsilon_2, \epsilon_3)=(v_1-\tilde{v}_1, v_2-\tilde{v}_2, i_3-\tilde{i}_3)$ is the synchronization error. If, by definition, $$\Psi(x, \tilde{x}) = \Phi(x) - \Phi(\tilde{x}) = \begin{pmatrix} -f(v_1)/C_1 + f(\tilde{v}_1)/C_1 \\ 0 \\ 0 \end{pmatrix} \quad (11)$$

then the error system of the impulsive synchronization is given by $$\begin{cases} \dot{e} = Ae + \Psi(x, \tilde{x}), t \neq \tau_i \\ \Delta e|_{t=\tau_i} = Be, i = 1, 2, \dots \end{cases} \quad (12)$$

The conditions for the asymptotic stability of impulsive synchronization can be found in Tao Yang and L. O. Chua, "Impulsive Control and Synchronization of Nonlinear Dynamical Systems and Application to Secure Communication", Electronics Research Laboratory, College of Engineering, University of California, Berkeley, Calif., Memorandum No. UCB/ERL M97/12, Jan. 29, 1997. The results in Yang-Chua also show that the impulsive synchronization is robust enough to additive channel noise and the parameter mismatch between the driving and driven systems.

C. Considerations for Investigating the Capacities of CDMA and $(CD)^2MA$

Several approaches to estimate the prior art cellular CDMA system capacity have been developed (e.g., K. S. Gilhousen, I. M. Jacobs, R. Padovani, A. J. Viterbi, and C. E. Wheatley, "On the Capacity of a Cellular CDMA System", *IEEE Transactions on vehicular Technology*, vol. 40 (2), pp. 303–12, May 1991; A. Salliiasi, "Cellular and Personal Communication Networks Based on the Application of Code Division Multiple Access (CDMA)", *Proc. of Virginia Tech's First Symp. on Wireless Personal Communication*, pp. 10.1–10.9, Jun. 3–5 1991; W. C. Y. Lee, "Overview of Cellular CDMA", *IEEE Trans. on Vehicular Technol.*, vol. 40 (2), pp.291–302, May 1991; and R. L. Pickholtz, L. B. Milstein, and D. L. Schilling, "Spread Spectrum for Mobile Communication", *IEEE Trans. on vehicular Technol.*, vol. 40 (2), pp. 313–322, May 1991). For purposes of this discussion, the method presented by Gilhousen is used to estimate the capacity of the $(CD)^2MA$ system of the present invention. Due to the structural differences between CDMA and $(CD)^2MA$ systems, the method presented by Gilhousen, which was developed for CDMA systems, needs to be revised so that it applies to $(CD)^2MA$ systems.

As in CDMA systems, the focus in a $(CD)^2MA$ system is on the reverse link capacity because the forward link uses coherent demodulation by the pilot carrier that is being tracked, and since the multiple transmitted signals of the pilot carrier are synchronously combined, the forward link performance will be superior to that of the reverse link.

The estimate of the capacity of a CDMA system depends on the model of the whole CDMA system. To model a CDMA system, the following factors are considered.

1. Interference

The interference to a given user from all other multiple access users is usually approximated by a Gaussian process (e.g., Ulloa et al. cited above). As with any digital communication system, spread spectrum or not, there are four components of the demodulator output:

the desired output.

the inter-chip interference components, which is usually called inter-symbol interference for non-spread digital demodulation.

the component due to background noise.

the other-user interference components.

In a CDMA system, the interference from the other users is much stronger than that from noise.

2. Power Control

It is well-known that one of the most serious problems faced by a DS CDMA system is the multi-user interference. Because all users are transmitting in the same frequency band and the cross-correlations of the codes are rarely zero, the signal-to-inference ratio, and hence the performance, decreases as the number of users increase, illustrating that DS CDMA system is an interference-limited, rather than a noise-limited, system.

An effect known as the "near-far" effect plays an especially important role when considering multi-user interference. The near-far effect can be explained by considering the reverse link. Due to the path-loss law (which implies that the received power decreases as the transmitter-receiver distance increases), a closer user will dominate over a user located at the boundary of the transmission range of the system. In order to partially overcome the near-far effect, power control has proven somewhat effective.

The propagating loss is generally modeled as the product of the $m^{th}$ power of distance, r, and a log-normal component that represents shadowing losses. This model represents slowly varying losses, even for users in motion, and applies to both reverse and forward links. The more rapidly varying Rayleigh fading losses are not included here. Thus, for a user at a distance, r, from a base station, attenuation is proportional to $$\alpha(r, \epsilon) = r^m 10^{\epsilon/10} \quad (13)$$

where $\epsilon$ is the decibel attenuation due to shadowing, with zero mean and standard deviation $\sigma$. Experimental data (e.g., W. C. Y. Lee, *Mobile Cellular Telecommunications Systems*, McGraw-Hill, N.Y., 1989) suggests the choices of m=4 for the power law and $\sigma=8$ dB for the standard deviation of $\epsilon$.

Power control can be established by letting the base station continuously transmit a pilot signal that is monitored by all mobile stations. According to the power level of that pilot signal detected by the mobile station, the transmission power level of the mobile station is adjusted by that mobile station. In a practical power control system, power control errors occur (e.g., M. G. Jansen and R. Prasad, "Capacity, Throughput and Delay Analysis of a Cellular DS CDMA System with Imperfect Power Control and Imperfect Sectorization", *IEEE Transactions on Vehicular Technology*, vol. 44 (1), pp. 67–75, February 1995), implying that the average received power at the base station may not be the same for each user signal.

3. Multi-path Propagation

In terrestrial communication, a transmitted signal is reflected and refracted by different smooth or rough surfaces and different objects, so that when the transmitted signal is received by a receiving mobile station, the transmitted signal is replicated with different time delays at a receiving mobile station. This is called multi-path propagation. It can be quite severe in urban areas or within a building, as well as in mountainous regions. Different paths arrive at different amplitudes and carrier phases. The path amplitude depends on the relative propagation distances and the reflective or refractive properties of the terrain or buildings. In many cases, particularly in a confined area, each of the distinguishable multi-path signal components will itself actually be a linear combination of several signal components that took different indistinguishable subpaths of the overall path each resulting in a subsignal component of varying amplitudes. Since these signals and subsignals add as random vectors, the amplitude of each term of the overall received signal appears to be Rayleigh-distributed, and the phases uniformly distributed. This is the most commonly accepted model (see A. J. Viterbi, *CDMA Principles of Spread Spectrum Communication*, Addison-Wesley Wireless Communications Series, Addison-Wesley Pub. Co., Reading, Mass., 1995).

Since two code sequences with a relative delay of more than two chip durations usually have a low correlation value compared to the fully synchronized situation, DS CDMA systems offer the possibility to distinguish between paths with a relative delay of more than two chip durations. This is called the inherent diversity of DS CDMA systems, implying that it is possible to resolve a number of paths separately using only one receiver. This property makes DS CDMA systems suitable for applications in mobile radio environments, which are usually corrupted with severe multi-path effects.

The multi-path fading channel for the $k^{th}$ mobile station is characterized by a set of low-pass equivalent complex-value impulse responses $$\left\{ h_k(t) = \sum_{l=1}^{L} a_{kl} \delta(t - \tau_{kl}) \exp(-j\phi_{kl}) \right\}_{k=1}^{K} \quad (14)$$

where K denotes the number of the active users. For this discussion it is assumed that every link has a fixed number of resolvable paths, L. The path gains, $\{a_{kl}\}_{l=1}^{L}$, the path delays, $\{Y_{kl}\}_{l=1}^{L}$, and the path phases, $\{\Phi_{kl}\}_{l=1}^{L}$, are three random variables. For a given user, k, the path gain, $\{a_{kl}\}_{l=1}^{L}$, is modeled as the set of independent Rayleigh random variables whose probability density functions are given by:

$$p(\alpha_k) = \frac{2\alpha_k e^{-\alpha_k^2/\sigma_{kr}^2}}{\sigma_{kr}^2}, \alpha > 0, k = 1, 2, \ldots, L \quad (15)$$

Supposing that the L multipath components are all Rayleigh-distributed of equal average strength, so that $$\sigma_{kr}^2 = \sigma_r^2, \text{for all } k=1,2,\ldots,L \quad (16)$$

According to Wu, et al. (Geng Wu, A. Jalali, and P. Mermelstein, "On Channel Model Parameters for Microcellular CDMA Systems", *IEEE Transactions on vehicular Technology*, vol. 44 (3), pp. 706–11, August 1995), $\sigma_r$=4 dB is chosen. The path delays, $\{Y_{kl}\}_{l=1}^{L}$, are mutually independent and uniformly distributed $[\Delta_1, \Delta_2]$, and the path phases, $\{\Phi_{kl}\}_{l=1}^{L}$, are independent uniform random variables over (0,2π), all of which are also statistically independent of each other. For purposes of the discussion below L=5 is chosen, and the values of $\Delta_1$ and $\Delta_2$ are chosen as indicated below in the corresponding simulations.

D. Channel Capacity of (CD)²MA

For simplicity of the discussion here, only a study the unsectorized cases is made which is sufficient to illustrate the improvement of the use of the present invention (CD)²MA system over the CDMA system of the prior art. For the sectorized cases all the arguments of the relationships between CDMA systems and (CD)²MA systems are also valid.

For the Shannon limit, the number of users that can be present in a cell is $$M = \frac{G_p}{E_b/N_0} \leq 1.45 G_p \quad (17)$$

where $E_b$ is the energy per bit and $N_o$ is the noise power spectral density. Additionally, $G_p$ is the system processing gain which is given by $$G_p = B_w/R \quad (18)$$

where $B_w$ is the bandwidth of the channel and R is the information rate.

In an actual system, the CDMA system cell capacity is much lower than the theoretical upperbound value given in Equation 17. The CDMA system cell capacity is affected by receiver modulation performance, power control accuracy, interference from other non-CDMA systems sharing the same frequency band, and other effects.

Every cell in a CDMA system shares the same bandwidth therefore causing intercell interference, which is accounted for by introducing a factor β. The practical range of β is 0.5–0.55. The interference from users in other cells reduces the permissible number of users in a cell. The power control accuracy in the following discussion is represented by a factor α. The practical range for α is 0.5–0.9. The reduction in the interference due to voice activity is represented by ν which has a practical range of 0.45–1. Then Equation 17 becomes $$M = \frac{G_p}{E_b/N_0} \times \frac{1}{1+\beta} \times \alpha \times \frac{1}{\nu} \quad (19)$$

In the rest of this section, a design example is given that shows how a (CD)²MA system can have a larger capacity than CDMA systems. In CDMA system phase-shift keying (BPSK) is used for the data modulation and quadrature phase-shift keying (QPSK) for the spreading modulation. However, just for the purpose of demonstrating the improvement of channel capacity presented by (CD)²MA systems, assume that the coherent BPSK is employed for both the data modulation and the spreading modulation. Then the transmitted encoded signal, x(t), in CDMA systems from user unit 1 (see FIG. 1) is given by $$x(t)=c(t)d(t)\cos(\omega t) \quad (20)$$

and for a transmitting user unit 100 in (CD)²MA systems (see FIG. 2) it is given by $$x(t)=c(t)d(t) \quad (21)$$

In CDMA systems, the receiving user unit 3 (see FIG. 1) multiplies the received signal from filter 21 by the PN (pseudo noise) waveform, c(t), to obtain the signal that is to correspond to d(t) within the transmitting user unit 1, which is $$r_1(t)=c(t)(x(t)+I(t))=c^2(t)d(t)\cos(\omega t)+c(t)I(t)=d(t)\cos(\omega t)+c(t)I(t) \quad (22)$$

where I(t) denotes the sum of noise and interference. For the receiving user unit 102 of the (CD)²MA system (see FIG. 2), the signal that is to correspond to d(t) within the transmitting user unit 100 is $$r_2(t)=c(t)(x(t)+I(t))=d(t)+c(t)I(t) \tag{23}$$

Since the frequency of d(t) is much less than c(t)I(t), from Equation 23 we know that the SNR (Signal to Noise Ratio) of $r_2$ (t) can be significantly enhanced by using a low-pass filter before performing further processing. This is not the case for CDMA systems as can be seen from an inspection of Equation 22, in which d(t)cos(ωt) and c(t)I(t) have similar frequency ranges. Thus, only a small $E_b/N_o$ is needed in $(CD)^2MA$ systems, unlike CDMA systems. Furthermore, the interference from other users is also reduced in $(CD)^2MA$ systems.

Simulation results are next discussed to show that $(CD)^2MA$ systems have a lager capacity than do CDMA systems. For the simulations, the following conditions were used: RF bandwidth, $B_w=1.25$ MHz; a chip rate of 1.2288 Mcps, and a data rate, R=9.6 Kbps. For a CDMA system, assume that $E_b/E_o=6$ dB, the interference from neighboring cells, β=60%, the voice activity factor, ν=50%, and the power control accuracy factor, α=0.8. Then for a CDMA system, the channel capacity is 33 mobile users per cell (Note: only the unsectroized cell has been considered in this discussion).

The most important benchmark for evaluating the service quality of a digital communication system is the bit-error-rate (BER). For purposes of discussion here, the desired performance of the $(CD)^2MA$ system is chosen to be BER≦$10^{-3}$, which is the same as that used above for a CDMA system. The condition for this evaluation is as follows. Suppose that every mobile station has a perfect power control performance then the base station will receive signals of equal power from each mobile station. Further assume that the delays due to multi-paths are distributed uniformly in (0.4 μs, 1.2 μs), i.e., $\Delta_1=0.4$ μs and $\Delta_2=1.2$ μs, which corresponds to the range of from 0.5 chip duration to 1.5 chip duration used in CDMA systems. The simulation results for $(CD)^2MA$ systems with 60, 90 and 110 users/cell are summarized in Tables 2, 3 and 4 respectively.

TABLE 2

The relation between BER and $E_b/N_0$ with 60 users/cell

| $E_b/N_0$ | 3dB | 4dB | 5dB | 6dB |
|---|---|---|---|---|
| BER | $3.4 \times 10^{-3}$ | $6.8 \times 10^{-4}$ | $1.3 \times 10^{-4}$ | $3.7 \times 10^{-5}$ |

TABLE 3

The relation between BER and $E_b/N_0$ with 90 users/cell.

| $E_b/N_0$ | 3dB | 4dB | 5dB | 6dB |
|---|---|---|---|---|
| BER | $7.5 \times 10^{-3}$ | $2.3 \times 10^{-3}$ | $7.3 \times 10^{-4}$ | $2.9 \times 10^{-4}$ |

TABLE 4

The relation between BER and $E_b/N_0$ with 110 users/cell.

| $E_b/N_0$ | 3dB | 4dB | 5dB | 6dB |
|---|---|---|---|---|
| BER | $4.4 \times 10^{-2}$ | $3.8 \times 10^{-2}$ | $3.1 \times 10^{-2}$ | $2.7 \times 10^{-2}$ |

From Table 2 for a $(CD)^2MA$ system with 60 users/cell it can be seen that $E_b/N_o=4$ dB is enough to give a good results. In the simulation to determine this result an RF bandwidth of $B_w=1.25$ MHz was used together with a 10-shift cipher to generate the spread carriers. Additionally, a data rate of R=9.6 Kbps was used with an overhead channel to transmit synchronizing impulses for all users. The synchronizing impulses in such a system are digitalized into 32-bit floating point numbers, and every user needs to refresh their synchronizing impulses once a second. Also, the bit rate of the overhead channel should be greater than 5.76 Kbps for all of the 60 users in the cell.

Figure 5A:
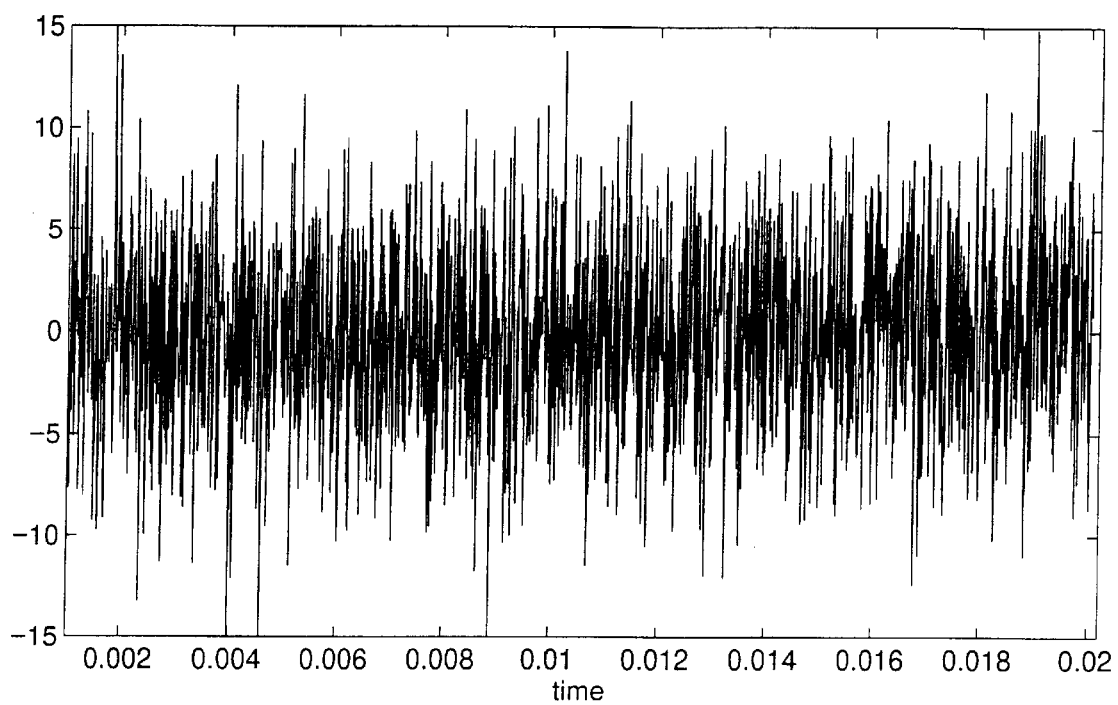
Figure 5B:
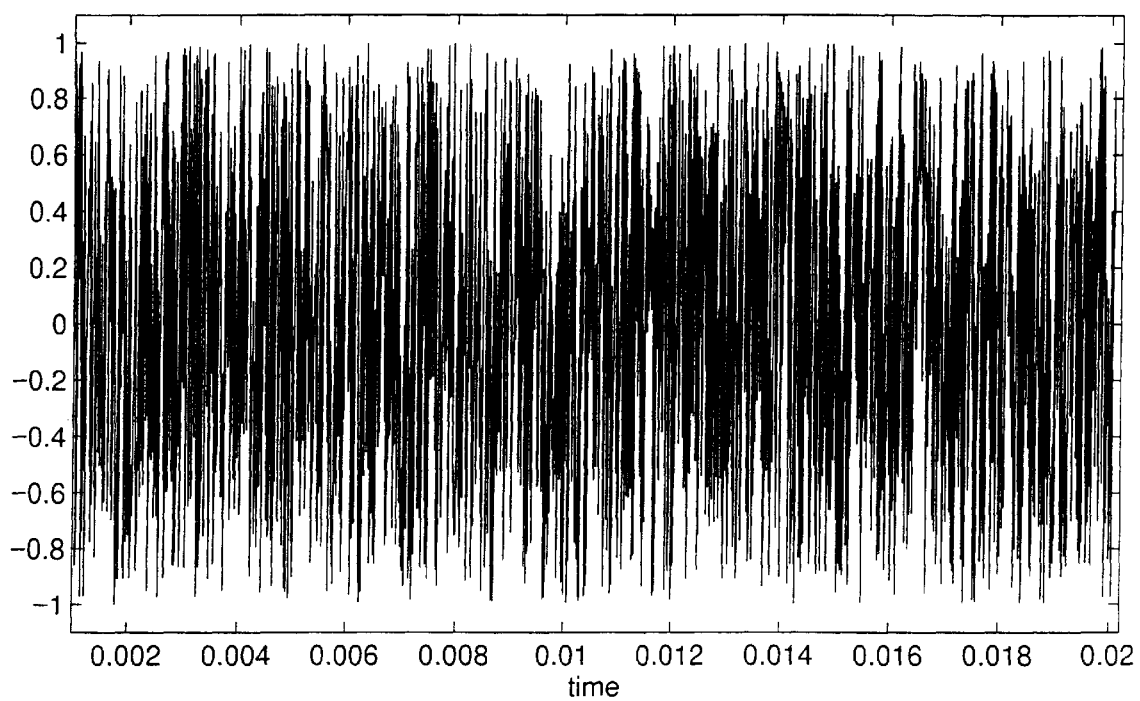
Figure 5C:
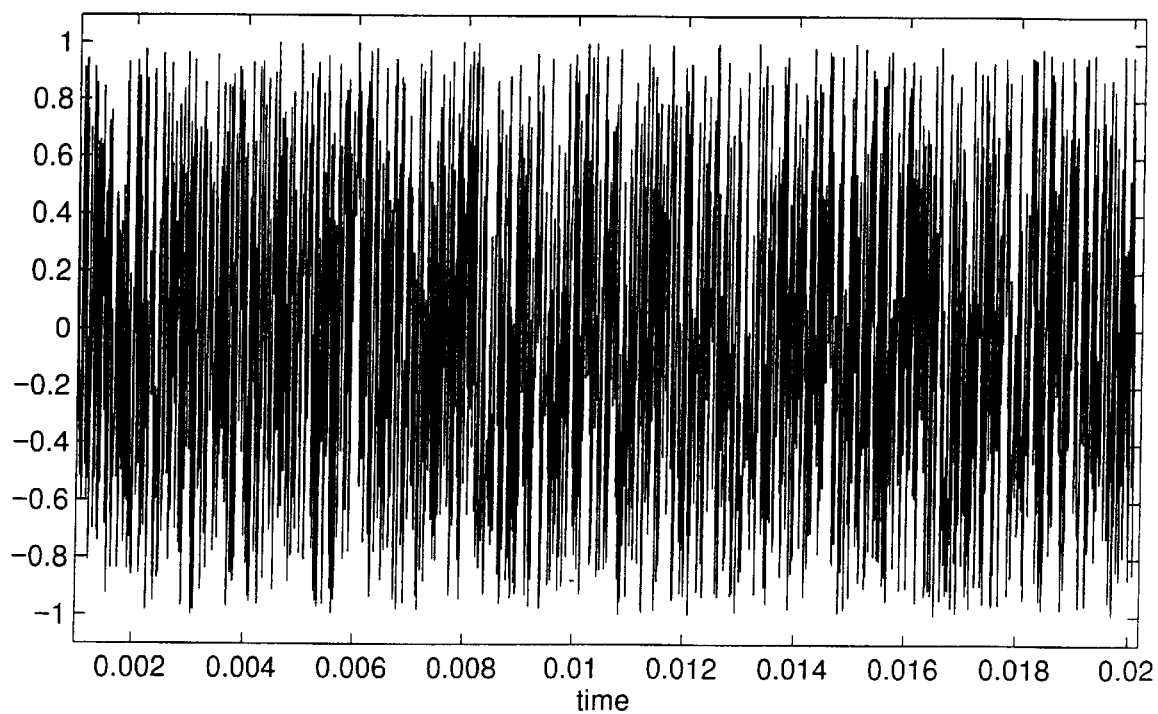
Figure 5D:
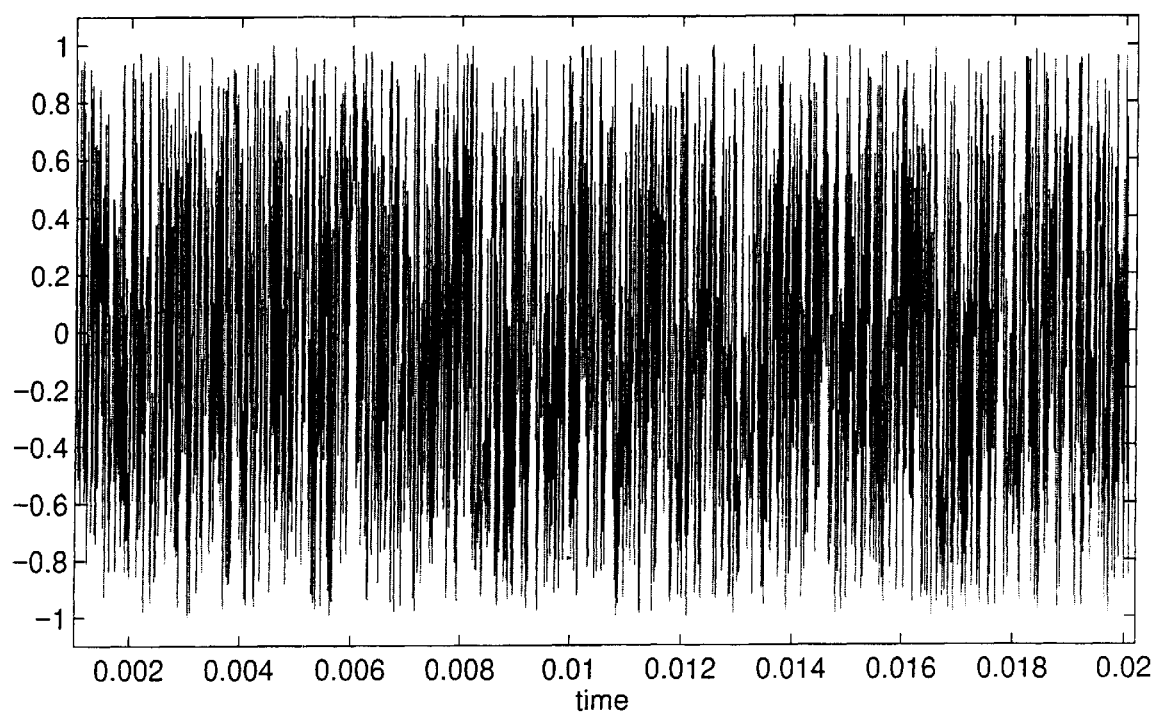
Figure 5E:
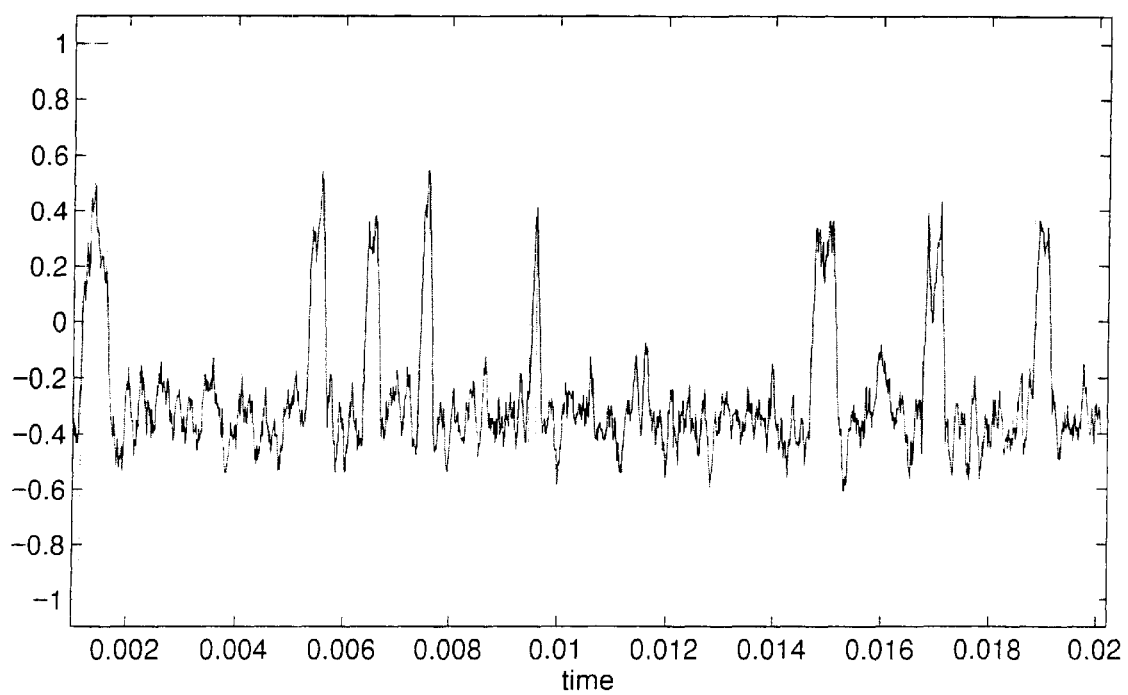
Figure 5F:
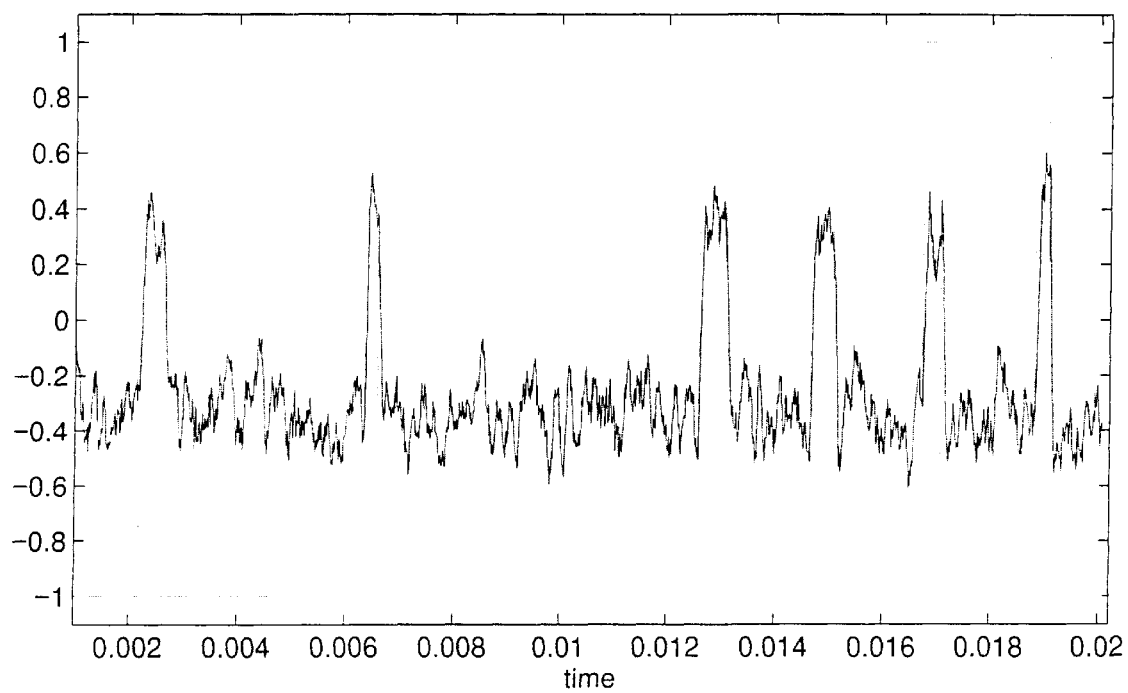
Figure 5G:
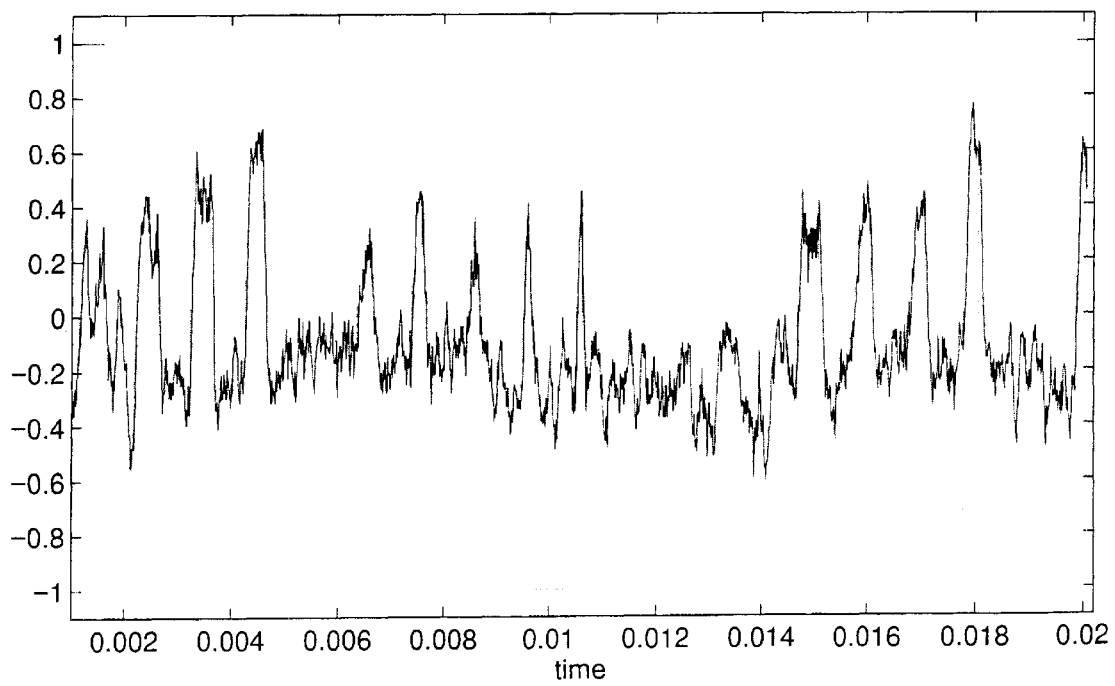

The results for that simulation are illustrated in FIGS. 5*a* through 5*g* shows the mixed signal in the channel which is a mixture of 60 spreading carriers. FIGS. 5*b*, 5*c* and 5*d* show the spreading carriers of there users A, B and C, respectively. FIGS. 5*e*, 5*f* and 5*g* show the message signals (continuous waveforms) and the recovered signals (dotted waveforms) for the same three users A, B and C, respectively. From FIGS. 5*e*, 5*f* and 5*g*, it can be seen that the recovered signals are each different digital signals that have been recovered using the $(CD)^2MA$ system of the present invention.

Figure 6A:
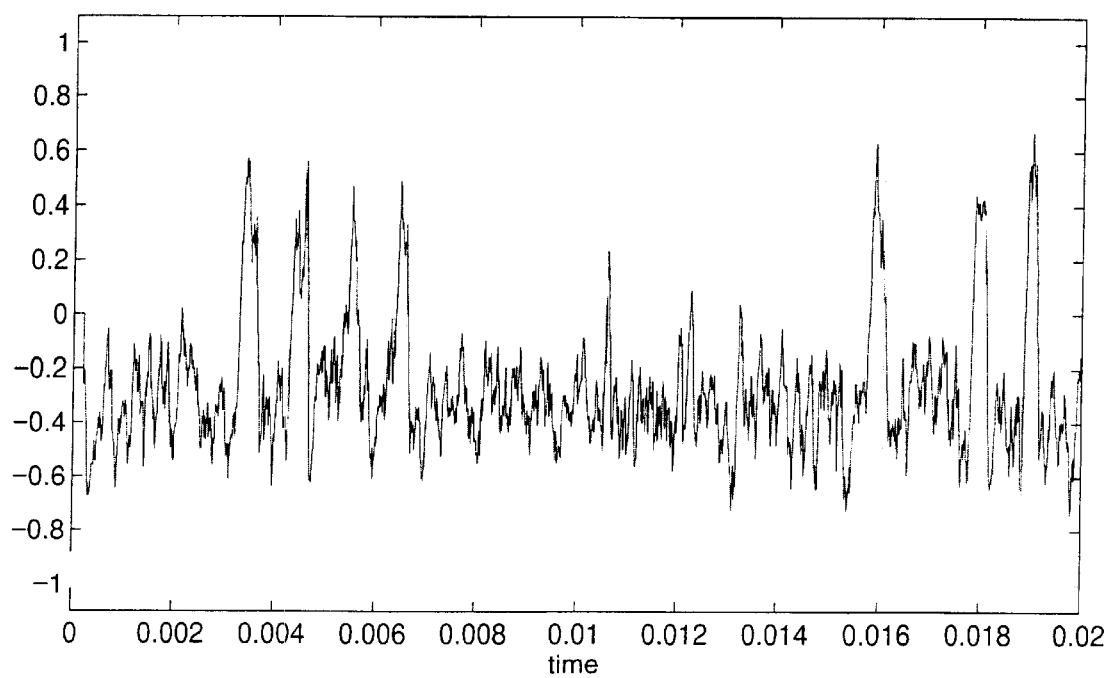
Figure 6B:
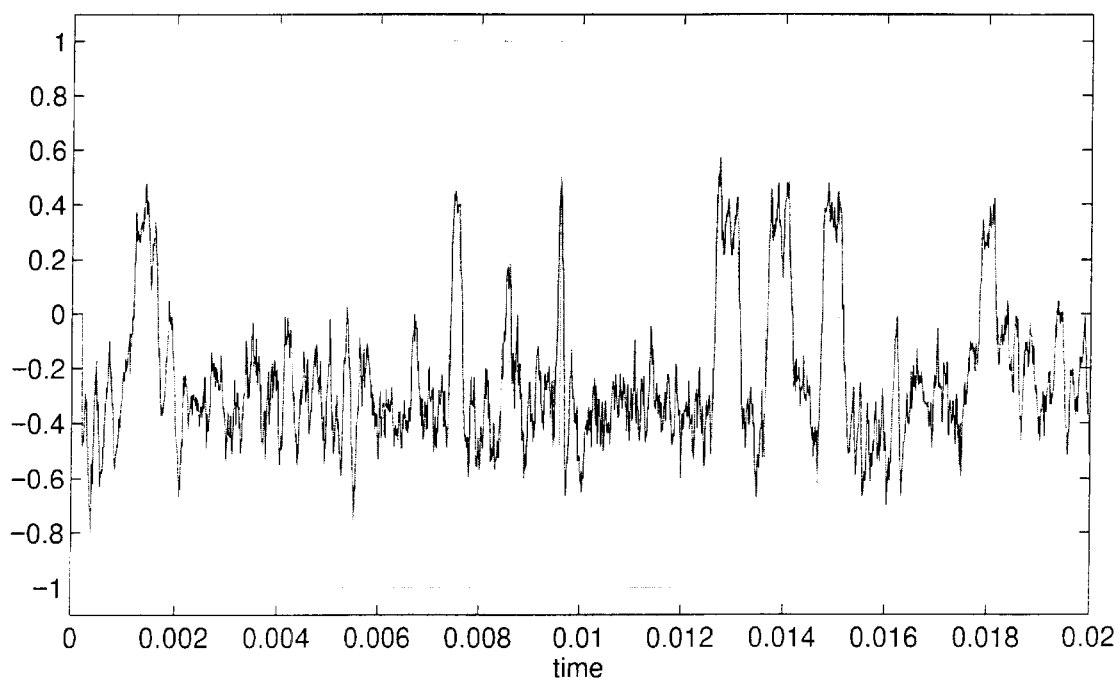
Figure 6C:
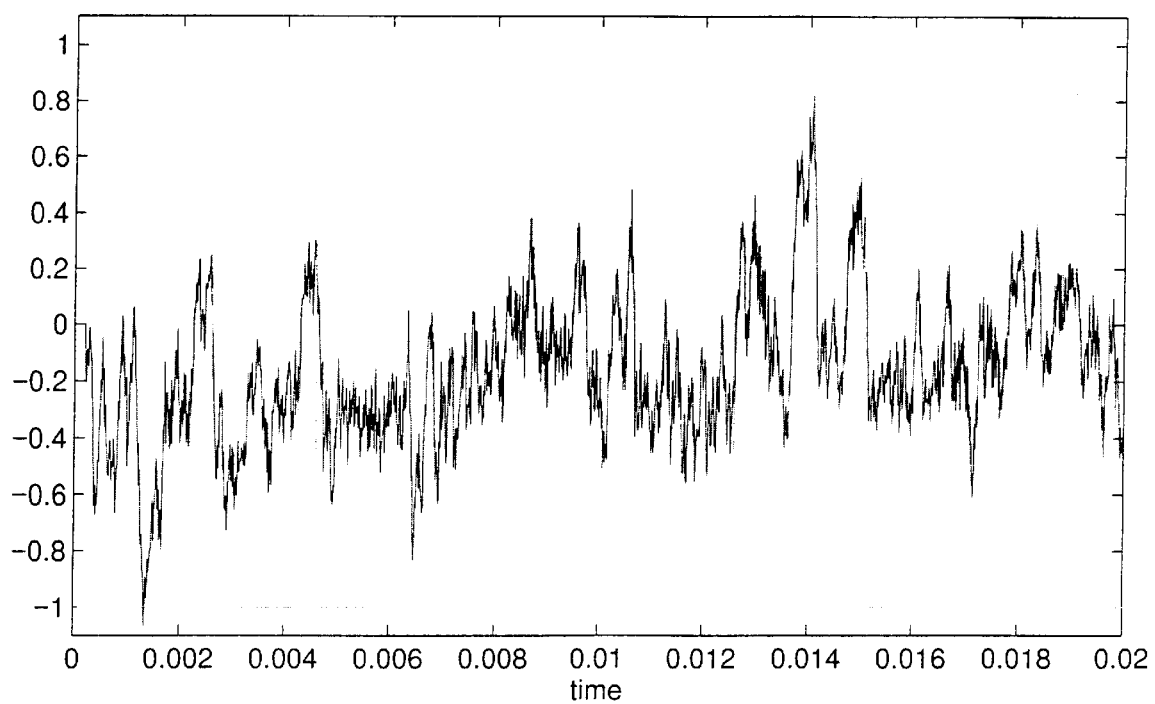

For comparison, the simulation results of a $(CD)^2MA$ system with 110 users/cell with $E_b/N_o=4$ dB are presented in Table 4 and FIGS. 6*a*, 6*b* and 6*c*. Here it can be seen that the interference becomes so strong that an increase of $E_b/N_o$ can not decrease the BER significantly since all of the values shown here have a multiplier of $10^{-2}$, thus they vary by less than a power of 10, whereas in the 60 users/cell case of Table 2 the multipliers vary from $10^{-3}$ to $10^{-5}$ resulting in a variation of the power of 100 for the same $E_b/N_o$ range of values. The simulation results for the 110 users/cell case are further illustrated in FIGS. 6*a* through 6*c* where, as in FIGS. 5*e* through 5*g* for the 60 users/cell case, the message signals are compared to the recovered signals for users A, B and C, respectively. From FIG. 6*c* it can be seen that for user C, there exists very serious bit errors with a large bit error probability which may very much degrade speech quality. This is evident from the rapid increase in the response between 0.006 and 0.008 on the time axis.

Figure 7A:
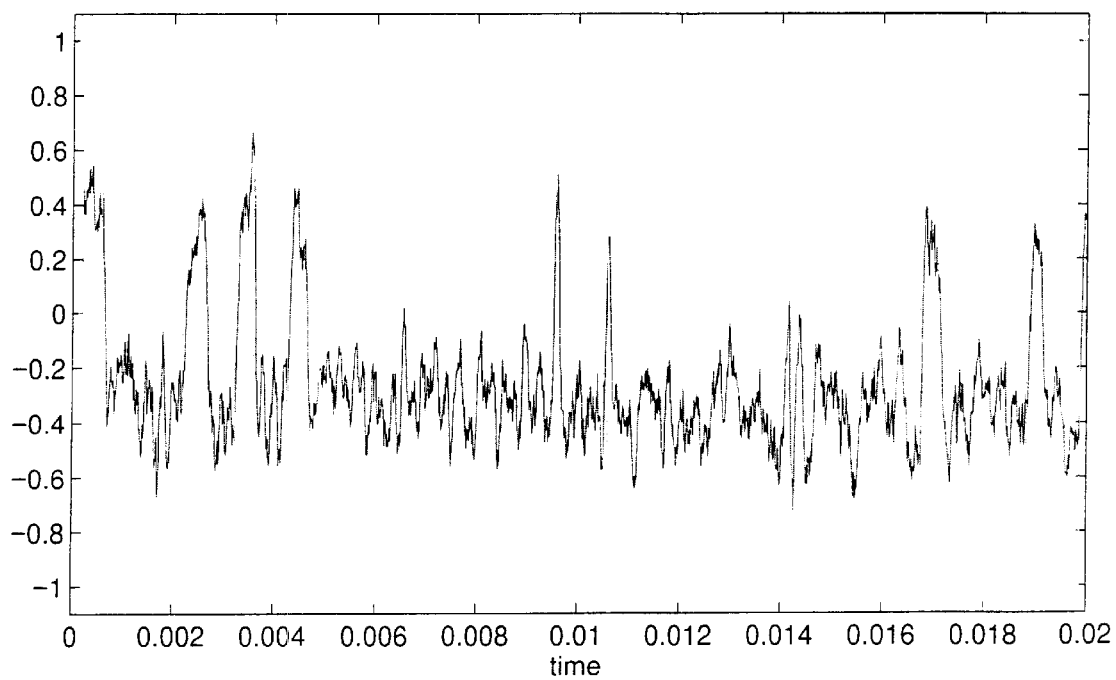
Figure 7B:
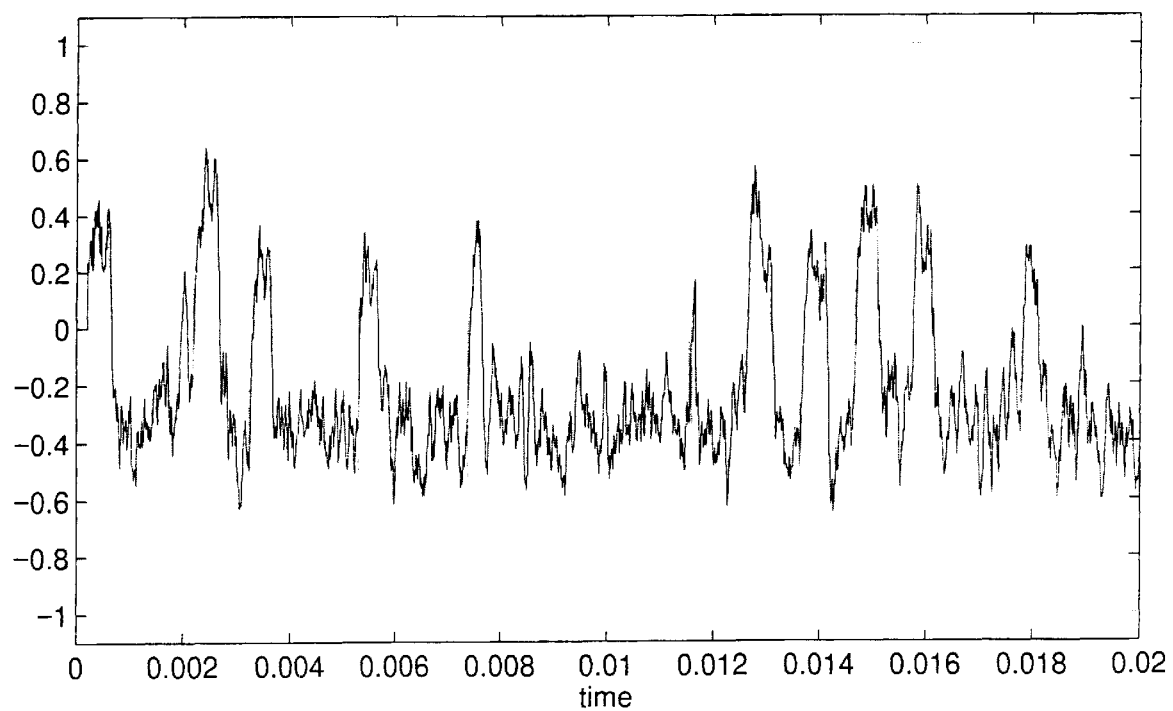
Figure 7C:
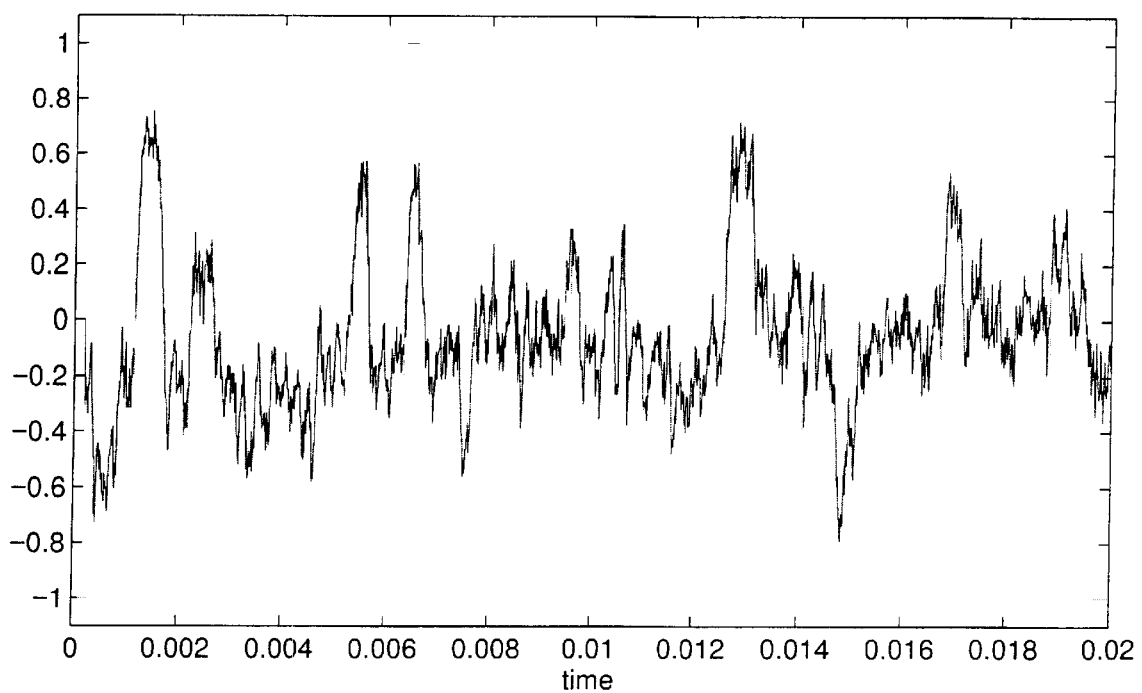

A third simulation was done between those for 60 users/cell and 110 users/cell, namely for 90 users/cell also with $E_b/N_o=4$ dB. The results of this simulation are summarized in Table 4 and illustrated in FIGS. 7*a* through 7*c*. In this situation the variation shown in Table 2 simply by examining the multipliers of the BER results it can be seen that that variation is greater than a power of 10, thus indicating that the service quality is better than the 110 users/cell case and not as good as for the 60 users/cell case, however still usable since the BER is less than $10^{-3}$ (see Tables 2–4). Additionally, FIGS. 7*a*, 7*b* and 7*c* each shows the recovered signals (continuous waveform) and the message signals (dotted waveform) of users A, B and C, respectively. By comparing FIG. 7*c* with FIG. 6*c* it can be seen that for user C, there exists fewer bit errors in the 90 users/cell configuration, than for the 110 users/cell configuration since the response peaks in the dotted areas of interest are larger in FIG. 7*c* than in FIG. 6*c*.

Figure 8:
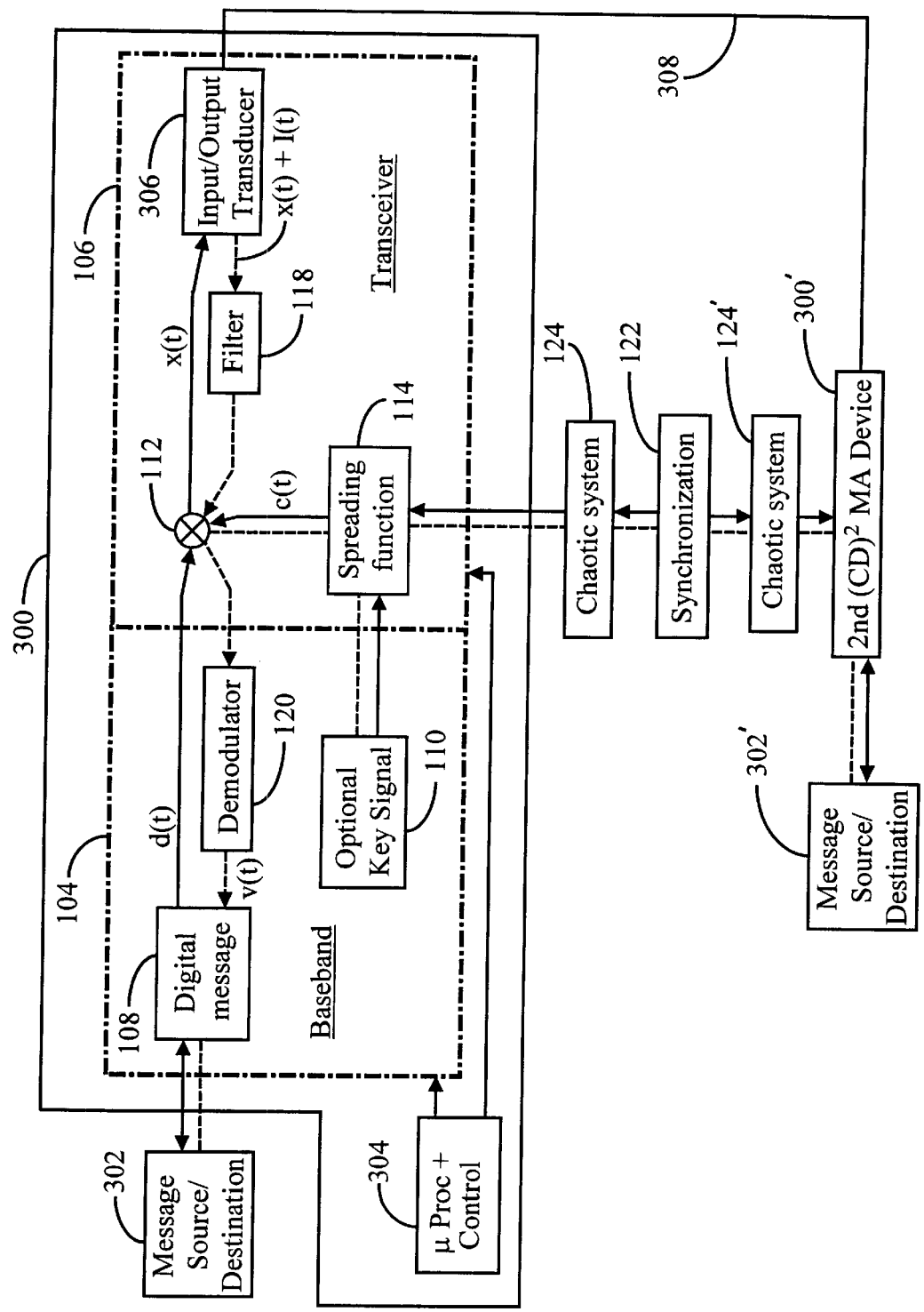
FIG. 8 is a block diagram of two interacting (CD)²MA devices and supporting blocks with the internal details for both send and receive elements shown interacting with each other.

FIG. 8 is a block diagram of the system of the present invention that is similar to the block diagram in FIG. 2. In FIG. 2 there were two $(CD)^2MA$ devices 100 and 102 with the first only showing the details of the sending elements and the second only showing details of the receiving elements for purposes of more easily describing the operational theory of the present invention. In FIG. 8 the first $(CD)^2MA$ device 300 is shown having both the sending and receiving components and the interconnection of those components. To illustrate the sending and receiving signal paths, in addition to the use of arrowheads, the send paths are shown with solid lines interconnecting the various blocks, while the receive paths are shown with dashed lines. For those paths that are the same in the send and the receive directions, a combined solid and dashed line is used. Each of the blocks within the baseband and transceiver sections 104 and 106, respectively, as well as the chaotic systems and synchronization, that are the same as in FIG. 2 have the same reference number in FIG. 8, and they perform in the same way described above in the discussion of FIG. 2.

FIG. 8 also includes several additional blocks to illustrate the many different applications for which the $(CD)^2MA$ device of the present invention may be employed. As was mentioned above, the source of the "message" to be transmitted between the two $(CD)^2MA$ device can be any of many different devices such as a microphone and amplifier for transmission of voice or a computer for transmission of data. Additionally, the source of the signal, or "message" could also be a transducer (e.g., ultrasonic, infrared, etc.) that is monitoring a phenomena in a work piece. This is illustrated in FIG. 8 with the message source/destination block 302 that is in communication with digital message block 108 in both directions. A microprocessor and control block is also shown interfacing with both the base band 104 and transceiver 106 block to provide the necessary timing and control to each block in the $(CD)^2MA$ device.

Further, while FIG. 2 including antennas 106 and 106' for the discussion of the theoretical operation of the present invention with the transmission mode being RF transmission through air, FIG. 8 includes an input/output transducer 306 in place of antenna 106. This has been done here since the present invention is not limited to RF transmission through air, thus the transducer may take any of many different forms depending on the application. For example, if the transmission path 308 is RF radiation through ether (air, vacuum or interplanetary space) between the two $(CD)^2MA$ devices then transducer 306 with be an antenna, whereas if transmission path 308 is coaxial cable transducer may be an impedance matching amplifier and coaxial connector. Path 308 could also be fiber optic cable in which case transducer 306 would be a voltage/light transducer. If path 308 is water then transducer 306 would be a sonar, or similar transducer. Still another possibility is that path 308 may be a relatively solid material such as the earth, rock, concrete, brick, plastic, etc. in which case transducer 306 could take on many different forms, perhaps one that transmits and receives vibrations (low frequency, ultrasonic, etc.), electrical signals (DC or AC in various signal patterns and frequencies), light (infrared, ultraviolet, visible, etc.), heat, surface waves . . . the choices are only limited by the imagination and the potential application where it is desired to transmit information.

While the above discussion has been provided to illustrate several embodiments and applications for the present invention, one skilled in the art would easily be able to extend the embodiments and applications for the present invention beyond that which has been discussed herein. Clearly those alternative embodiments and applications are included within the scope of the ideas presented here either directly or as equivalents that one skilled in the art will recognize as such. Thus the scope of protection of the present invention should only be limited by the claims appended hereto.

What is claimed is:

1. A method of modulating a code-division multiple access device that receives information to be transmitted from a selected device, said method comprising the steps of:

a. chaotically generating a seed signal;

b. spreading the spectrum of said seed signal of step a. to generate a spread spectrum signal; and c. modulating said spread spectrum signal from step b. with said information to be transmitted.

2. A method of modulating a code-division multiple access device as in claim 1 wherein step c. includes the steps of:

d. digitizing said information to be transmitted; and e. modulating said spread spectrum signal from step b. with said digitized information from step d.

3. A method of modulating a code-division multiple access device as in claim 1 further including the step of:

d. scrambling said spread spectrum signal prior to step c.

4. A method of modulating a code-division multiple access device as in claim 1 further including the step of:

d. preceding step a., randomly selecting and applying initial conditions to a chaotic circuit to generate said seed signal.

5. A method of modulating a code-division multiple access device as in claim 4 wherein said chaotic circuit is Chua's circuit.

6. A method of modulating a code-division multiple access device as in claim 5 wherein Chua's circuit includes a Chua's diode and said seed signal is a voltage across said Chua's diode that is normalized.

7. A method of communication between first and second code-division multiple access devices that transmit selected information therebetween via a selected medium, said method comprising the steps of:

a. chaotically generating a seed signal;

b. applying said seed signal of step a. to a first spectrum spreading device in said first code-division multiple access device to generate a first spread spectrum signal in said first code-division multiple access device;

c. modulating said first spread spectrum signal from step b. with said information to be transmitted by said first code-division multiple access device;

d. applying said modulated signal of step c. to said medium for transmission to said second code-division multiple access device;

e. applying said seed signal of step a. to a second spectrum spreading device in said second code-division multiple access device to generate a second spread spectrum signal in said second code-division multiple access device;

f. multiplying said modulated signal received from said medium of step d. together with said second spread spectrum signal of step e. to create a combined signal; and g. demodulating said combined signal of step f. to generate a recovered information signal.

8. A method of communication between first and second code-division multiple access devices as in claim 7 wherein step c. includes the steps of:

h. digitizing said information to be transmitted; and i. modulating said first spread spectrum signal from step b. with said digitized information from step h.

9. A method of communication between first and second code-division multiple access devices as in claim 7 further including the steps of:

h. scrambling said first spread spectrum signal prior to step c. with a selected key signal; and i. scrambling said second spread spectrum signal prior to step f. with said selected key signal.

10. A method of communication between first and second code-division multiple access devices as in claim 7 wherein step f. includes the steps of:
   h. filtering said modulated signal from said medium to remove transmission noise from said modulated signal; and
   i. multiplying said filtered modulation signal from step h. together with said second spread spectrum signal of step e. to create said combined signal.

11. A method of communication between first and second code-division multiple access devices as in claim 7, preceding step a., further including the step of:
   h. randomly selecting and applying initial conditions to a chaotic circuit to generate said seed signal.

12. A method of communication between first and second code-division multiple access devices as in claim 11 wherein:
   there is a first chaotic circuit associated with said first code-division multiple access device and a second chaotic circuit associated with said second code-division multiple access device with said randomly selected initial conditions being applied to each of said first and second chaotic circuits; and
   said method further includes the step of:
      i. applying impulsive synchronization to each of said first and second chaotic circuits at preselected intervals to maintain said first and second spread spectrum signals substantially the same during interaction between said first and second code-division multiple access devices.

13. A method of modulating a code-division multiple access device as in claim 7 or 11 wherein said chaotic circuit is Chua's circuit.

14. A method of modulating a code-division multiple access device as in claim 7 or 11 wherein said chaotic circuit is a Chua's circuit that includes a Chua's diode and said seed signal is a normalized signal of the voltage across said Chua's diode.

15. A method of modulating a code-division multiple access device as in claim 12 wherein each of said first and second chaotic circuits is Chua's circuit.

16. A method of modulating a code-division multiple access device as in claim 15 wherein each of Chua's circuits includes a Chua's diode and said seed signal from each of said Chua's circuits is a voltage across said Chua's diode that is normalized.

17. A method of communication between first and second code-division multiple access devices as in any one of claims 7–12 further includes the repetition of all of the recited steps for transmitting information from said second code-division multiple access device to said first code-division multiple access device.

18. A method of communication between first and second code-division multiple access devices as in any one of claims 7–12 wherein:
   said medium is ether;
   step d. includes the step of applying said modulated signal to a first antenna for radiation through said ether; and
   said method, prior to step f., further includes the step of receiving said modulated signal from said ether with a second antenna.

19. A method of communication between first and second code-division multiple access devices as in any one of claims 7–12 wherein:
   said medium is a wire cable;
   step d. includes the step of applying said modulated signal to said wire cable through an appropriate first connector; and
   said method, prior to step f., further includes the step of receiving said modulated signal from said wire cable through an appropriate second connector.

20. A method of communication between first and second code-division multiple access devices as in any one of claims 7–12 wherein:
   said medium is a fiber optic cable;
   step d. includes the steps of:
      converting said modulated signal to a modulated light signal; and
      applying said modulated light signal to said fiber optic cable; and
   said method, prior to step f., further includes the steps of:
      receiving said modulated light signal from said fiber optic cable; and
      converting said modulated light signal to a modulated electronic signal.

21. A method of communication between first and second code-division multiple access devices as in any one of claims 7–12 wherein:
   said medium is a liquid;
   step d. includes the steps of:
      applying said modulated signal to a first acoustic transducer to generate a modulated acoustic signal; and
      applying said acoustic signal from said first acoustic transducer to said liquid; and
   said method, prior to step f., further includes the steps of:
      receiving said modulated acoustic signal from said liquid with a second acoustic transducer; and
      converting said modulated acoustic signal with said second acoustic transducer to a modulated electronic signal.

22. A method of communication between first and second code-division multiple access devices as in any one of claims 7–12 wherein:
   said medium is a solid material;
   step d. includes the steps of:
      converting said modulated signal to a modulated ultrasonic signal; and
      applying said modulated ultrasonic signal to said solid material; and
   said method, prior to step f., further includes the steps of:
      receiving said modulated ultrasonic signal from said solid material; and
      converting said modulated ultrasonic signal to an electronic modulated signal.

23. A method of communication between first and second code-division multiple access devices as in any one of claims 7–12 wherein:
   said medium is an optical system;
   step d. includes the steps of:
      applying said modulated signal to a light source having a selected bandwidth to generate a modulated optical signal; and
      applying said modulated optical signal from said light source to said optical system; and
   said method, prior to step f., further includes the steps of:
      receiving said modulated optical signal from said optical system; and
      converting said modulated optical signal receive from said optical system to an electronic modulated signal.

24. A code-division multiple access device to transmit and receive selected information to and from other code-division multiple access devices, said code-division multiple access device comprising:

a processor coupled to each component of said code-division multiple access device to control the transmit and receive operations thereof;

a message interface disposed to process a message signal for transmission and to provide a received message signal to and from a message source;

a spectrum spreading device disposed to receive a chaotic seed signal to control the generation of a carrier signal;

an input/output transducer disposed to deliver a message signal to a selected transmission medium for transmission to a second code-division multiple access device or to receive a message signal from said selected medium that was transmitted from a second code-division multiple access device;

a multiplier coupled to said spectrum spreading device, said message interface, and said input/output transducer to modulate said carrier signal with said message signal with the modulated signal applied to said input/output transducer in a transmit mode, and to multiply said received message signal from said input/output transducer with said carrier signal to create a received product signal in a receive mode; and a demodulator coupled between said multiplier and said message interface to demodulate said received product signal to create said received message signal that is delivered to said message interface.

25. A code-division multiple access device as in claim 24 wherein said message interface includes a digital encoder/decoder to digitally encode a message for transmission as said message signal and to decode said received message signal.

26. A code-division access device as in claim 25 wherein said digital encoder/decoder includes an analog to digital converter to encode said message as said message signal, and a digital to analog converter to decode said received message signal.

27. A code-division access device as in claim 24 further includes a key signal generator couple to said spectrum spreading device to scramble said carrier signal using a preselected code.

28. A code-division access device as in claim 24 wherein said chaotic seed signal is generated by chaotic circuit having the same preselected initial conditions as assigned to said second code-division multiple access device with which communication is established.

29. A code-division multiple access device as in claim 28 wherein said chaotic circuit is Chua's circuit.

30. A code-division multiple access device as in claim 29 wherein Chua's circuit includes a Chua's diode and said seed signal is a voltage across said Chua's diode that is normalized.

31. A code-division multiple access device as in claim 24 further including a noise filter coupled to said input/output transducer and said multiplier to filter said received message signal before being applied to said multiplier.

32. A code-division multiple access communication system comprising:

a chaotic device to generate a chaotic seed signal;

a selected transmission medium;

a first code-division multiple access device;

a second code division multiple access device;

wherein each of said first and second code-division multiple access devices are disposed to transmit and receive selected information between each other, and each includes:

a processor coupled to each component of said code-division multiple access device to control the transmit and receive operations thereof;

a message interface disposed to process a message signal for transmission and to provide a received message signal to and from a message source;

a spectrum spreading device disposed to receive said chaotic seed signal to control the generation of a carrier signal;

an input/output transducer disposed to deliver a message signal to said selected transmission medium for transmission to another code-division multiple access device or to receive a message signal from said selected transmission medium that was transmitted from another code-division multiple access device;

a multiplier coupled to said spectrum spreading device, said message interface, and said input/output transducer to modulate said carrier signal with said message signal with the modulated signal applied to said input/output transducer in a transmit mode, and to multiply said received message signal from said input/output transducer with said carrier signal to create a received product signal in a receive mode; and a demodulator coupled between said multiplier and said message interface to demodulate said received product signal to create said received message signal that is delivered to said message interface.

33. A code-division multiple access communication system as in claim 32 wherein said message interface includes a digital encoder/decoder to digitally encode a message for transmission as said message signal and to decode said received message signal.

34. A code-division multiple access communication system as in claim 33 wherein said digital encoder/decoder includes an analog to digital converter to encode said message as said message signal, and a digital to analog converter to decode said received message signal.

35. A code-division multiple access communication system as in claim 32 wherein each of said first and second code-division multiple access devices further includes a key signal generator coupled to said spectrum spreading device to scramble said carrier signal each using a matching preselected code.

36. A code-division multiple access communication system as in claim 32 wherein said chaotic device includes a first chaotic circuit coupled to said first code-division multiple access device and a second chaotic circuit coupled to said second code-division multiple access device with both said first and second chaotic circuits having the same preselected initial conditions.

37. A code-division multiple access communication system as in claim 36 wherein each of said first and second chaotic circuit is a Chua's circuit.

38. A code-division multiple access communication system as in claim 37 wherein Chua's circuit includes a Chua's diode and said seed signal is a voltage across said Chua's diode that is normalized.

39. A code-division multiple access communication system as in claim 36 or 37 further includes a synchronization circuit to randomly select and apply said initial conditions to each of said first and second chaotic circuits and to apply impulsive synchronization to each of said first and second chaotic circuits at preselected intervals to maintain said first and second spread spectrum signals substantially the same during interaction between said first and second code-division multiple access devices.

40. A code-division multiple access communication system as in claim 35 further includes a synchronization circuit to randomly select and apply said preselected code to each of said key signal generators.

41. A code-division multiple access communication system as in claim 32 wherein each of said first and second code-division multiple access devices further includes a noise filter coupled to said input/output transducer and said multiplier to filter said received message signal before being applied to said multiplier.

42. A code-division multiple access communication system as in any one of claims 32–41 wherein:

said medium is ether; and said input/output transducer in each of said first and second code-division multiple access devices is an antenna to apply said modulated signal to, and receive a radiated signal from, said ether.

43. A code-division multiple access communication system as in any one of claims 32–41 wherein:

said medium is a wire cable; and said input/output transducer in each of said first and second code-division multiple access device includes an appropriate connector to apply said modulated signal to, and receive a signal from, said wire cable.

44. A code-division multiple access communication system as in any one of claims 32–41 wherein:

said medium is a fiber optic cable; and said input/output transducer in each of said first and second code-division multiple access device includes an electric/optical converter to convert said modulated signal to a modulated light signal for application of a modulated light signal to said fiber optic cable, and to convert said modulated light signal received from said fiber otic cable to a modulated electronic signal.

45. A code-division multiple access communication system as in any one of claims 32–41 wherein:

said medium is a liquid; and said input/output transducer in each of said first and second code-division multiple access device includes an acoustic transducer to convert said modulated signal to a modulated acoustic signal for application to said liquid, and to convert said modulated acoustic signal received from said liquid to a modulated electronic signal.

46. A code-division multiple access communication system as in any one of claims 32–41 wherein:

said medium is a solid material; and said input/output transducer in each of said first and second code-division multiple access device includes an ultrasonic transducer to convert said modulated signal to a modulated ultrasonic signal for application to said solid material, and to convert said modulated ultrasonic signal received from said solid material to a modulated electronic signal.

47. A code-division multiple access communication system as in any one of claims 32–41 wherein:

said medium is an optical system; and said input/output transducer in each of said first and second code-division multiple access device includes:

a light source coupled to said optical system;

a light driver coupled to said light source coupled to receive said modulated signal to cause said light source to emit and apply a modulated light beam to said optical system; and a light detector coupled to said optical system to detect and convert a received modulated light beam from said optical system to said received modulated electronic signal.

\* \* \* \* \*